(12) United States Patent
Gunn, III

(10) Patent No.: US 7,120,338 B2
(45) Date of Patent: Oct. 10, 2006

(54) TUNING THE INDEX OF A WAVEGUIDE STRUCTURE

(75) Inventor: Lawrence Cary Gunn, III, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/242,318

(22) Filed: Sep. 10, 2002

(65) Prior Publication Data

US 2003/0068134 A1   Apr. 10, 2003

Related U.S. Application Data

(60) Provisional application No. 60/328,474, filed on Oct. 10, 2001, provisional application No. 60/327,137, filed on Oct. 4, 2001, provisional application No. 60/318,486, filed on Sep. 10, 2001, provisional application No. 60/318,445, filed on Sep. 10, 2001.

(51) Int. Cl.
*G02B 6/26* (2006.01)

(52) U.S. Cl. ............... 385/50; 385/15; 385/39; 385/40; 385/27; 385/30; 385/32; 385/9

(58) Field of Classification Search .......... 385/16, 385/27, 40, 32, 8–9, 30
See application file for complete search history.

(56) References Cited

U.S. PATENT DOCUMENTS

| | | | |
|---|---|---|---|
| 3,462,211 A | 8/1969 | Nelson et al. | |
| 3,634,788 A | 1/1972 | Craven | |
| 3,970,364 A | 7/1976 | Gerson et al. | |
| 3,976,358 A | 8/1976 | Thompson | |
| 4,420,873 A | 12/1983 | Leonberger et al. | |
| 4,669,086 A | 5/1987 | Kaede et al. | |
| 4,728,167 A * | 3/1988 | Soref et al. .................... 385/16 |
| 4,776,655 A | 10/1988 | Robertson et al. | |
| 4,787,691 A | 11/1988 | Lorenzo et al. | |
| 4,857,973 A | 8/1989 | Yang et al. | |
| 4,874,216 A | 10/1989 | Utaka et al. | |
| 4,877,299 A | 10/1989 | Lorenzo et al. | |
| 4,956,682 A | 9/1990 | Ohmaka et al. | |
| 4,958,898 A | 9/1990 | Friedman et al. | |

(Continued)

FOREIGN PATENT DOCUMENTS

EP   0 726 477 A2   8/1996

(Continued)

OTHER PUBLICATIONS

Azzam, R. M. A. and N. M. Bashara, "Generalized Ellipsometry for Surfaces with Directional Preference: Application to Diffraction Gratings," *J. Opt. Soc. Am.* vol. 62, No. 12, Dec. 1972, pp. 1521-1523.

(Continued)

*Primary Examiner*—Brian Healy
*Assistant Examiner*—Eric Wong
(74) *Attorney, Agent, or Firm*—Knobbe, Martens, Olson & Bear, LLP

(57) ABSTRACT

The index of refraction of waveguide structures can be varied by altering carrier concentration. The waveguides preferably comprise semiconductors like silicon that are substantially optically transmissive at certain wavelengths. Variation of the carrier density in these semiconductors may be effectuated by inducing an electric field within the semiconductor for example by apply a voltage to electrodes associated with the semiconductor. Variable control of the index of refraction may be used to implement a variety of functionalites including, but not limited to, tunable waveguide gratings and resonant cavities, switchable couplers, modulators, and optical switches.

50 Claims, 21 Drawing Sheets

U.S. PATENT DOCUMENTS

| | | |
|---|---|---|
| 4,999,686 A | 3/1991 | Autier et al. |
| 5,001,523 A | 3/1991 | Lomashevich et al. |
| 5,003,359 A | 3/1991 | Abeles |
| 5,033,812 A | 7/1991 | Yoshida et al. |
| 5,048,907 A | 9/1991 | Wickman et al. |
| 5,061,030 A | 10/1991 | Miyamoto et al. |
| 5,078,516 A | 1/1992 | Kapon et al. |
| 5,101,459 A | 3/1992 | Sunagawa |
| 5,109,464 A | 4/1992 | Munowitz et al. |
| 5,125,065 A | 6/1992 | Stoll et al. |
| 5,132,843 A | 7/1992 | Aoyama et al. |
| 5,146,513 A | 9/1992 | Inoue et al. |
| 5,148,507 A | 9/1992 | Tanisawa |
| 5,199,092 A | 3/1993 | Stegmueller |
| 5,200,939 A | 4/1993 | Nishiwaki et al. |
| 5,222,162 A | 6/1993 | Yap et al. |
| 5,225,740 A | 7/1993 | Ohkawa |
| 5,227,701 A | 7/1993 | McIntyre |
| 5,303,319 A | 4/1994 | Ford et al. |
| 5,314,107 A | 5/1994 | d'Aragona et al. |
| 5,329,601 A | 7/1994 | Nakamura |
| 5,347,601 A * | 9/1994 | Ade et al. ............. 385/3 |
| 5,363,457 A | 11/1994 | Falt et al. |
| 5,436,991 A | 7/1995 | Sunagawa et al. |
| 5,459,807 A | 10/1995 | Doumuki et al. |
| 5,491,768 A * | 2/1996 | Chan ................. 385/132 |
| 5,534,824 A | 7/1996 | Nalos et al. |
| 5,546,494 A | 8/1996 | Eda |
| 5,613,020 A | 3/1997 | Uchida et al. |
| 5,625,725 A | 4/1997 | Nakano et al. |
| 5,625,729 A | 4/1997 | Brown |
| 5,654,818 A | 8/1997 | Yao |
| 5,682,455 A | 10/1997 | Kovacic et al. |
| 5,684,817 A | 11/1997 | Houdre et al. |
| 5,703,989 A | 12/1997 | Khan et al. |
| 5,710,849 A | 1/1998 | Little et al. |
| 5,737,474 A | 4/1998 | Aoki et al. |
| 5,742,433 A | 4/1998 | Shiono et al. |
| 5,745,630 A | 4/1998 | Vawter et al. |
| 5,759,453 A | 6/1998 | Kato |
| 5,784,400 A | 7/1998 | Joannopoulos et al. |
| 5,841,931 A | 11/1998 | Foresi et al. |
| 5,854,866 A | 12/1998 | Leonard |
| 5,889,898 A | 3/1999 | Koren et al. |
| 5,908,305 A * | 6/1999 | Crampton et al. ........ 438/141 |
| 5,917,981 A | 6/1999 | Kovacic et al. |
| 5,920,662 A | 7/1999 | Hinkov |
| 5,930,437 A | 7/1999 | Nakai et al. |
| 5,955,749 A | 9/1999 | Joannopoulos et al. |
| 6,052,495 A | 4/2000 | Little et al. |
| 6,055,342 A | 4/2000 | Yi et al. |
| 6,101,300 A | 8/2000 | Fan et al. |
| 6,108,464 A | 8/2000 | Foresi et al. |
| 6,134,369 A | 10/2000 | Kurosawa |
| 6,151,430 A | 11/2000 | Traver, Jr. et al. |
| 6,175,671 B1 | 1/2001 | Roberts |
| 6,195,187 B1 | 2/2001 | Soref et al. |
| 6,229,947 B1 | 5/2001 | Vawter et al. |
| 6,243,517 B1 | 6/2001 | Deacon |
| 6,261,525 B1 | 7/2001 | Minaee |
| 6,278,822 B1 | 8/2001 | Dawnay |
| 6,285,813 B1 | 9/2001 | Schultz et al. |
| 6,374,001 B1 | 4/2002 | Bozeat et al. |
| 6,396,984 B1 | 5/2002 | Cho et al. |
| 6,400,490 B1 | 6/2002 | Hosoi |
| 6,411,752 B1 | 6/2002 | Little et al. |
| 6,466,342 B1 | 10/2002 | Frigo et al. |
| 6,507,681 B1 | 1/2003 | Kowalczyk et al. |
| 6,549,685 B1 | 4/2003 | Marks et al. |
| 6,614,977 B1 | 9/2003 | Johnson et al. |
| 6,631,225 B1 | 10/2003 | Lee et al. |
| 6,633,696 B1 * | 10/2003 | Vahala et al. ............. 385/27 |
| 6,636,668 B1 | 10/2003 | Al-hemyari et al. |
| 6,687,425 B1 * | 2/2004 | Ridgway et al. .......... 385/14 |
| 6,731,846 B1 | 5/2004 | Hosomi et al. |
| 6,734,453 B1 | 5/2004 | Atanackovic et al. |
| 6,751,368 B1 | 6/2004 | Lim et al. |
| 6,759,675 B1 | 7/2004 | Csutak et al. |
| 6,768,855 B1 | 7/2004 | Bakke et al. |
| 6,801,702 B1 | 10/2004 | Day |
| 6,831,938 B1 | 12/2004 | Gunn, III |
| 6,834,152 B1 | 12/2004 | Gunn et al. |
| 6,839,488 B1 | 1/2005 | Gunn |
| 6,895,148 B1 | 5/2005 | Gunn |
| 6,917,727 B1 | 7/2005 | Gunn et al. |
| 6,961,490 B1 | 11/2005 | Maisenhoelder et al. |
| 2002/0031321 A1 | 3/2002 | Lee et al. |
| 2002/0057720 A1 | 5/2002 | Nomura et al. |
| 2002/0081055 A1 | 6/2002 | Painter et al. |
| 2002/0094150 A1 | 7/2002 | Lim et al. |
| 2002/0094183 A1 | 7/2002 | Wu et al. |
| 2002/0164118 A1 | 11/2002 | Paddon et al. |
| 2002/0164129 A1 | 11/2002 | Jackson |
| 2002/0164143 A1 | 11/2002 | Csutak et al. |
| 2003/0002766 A1 | 1/2003 | Pruneri et al. |
| 2003/0031446 A1 | 2/2003 | Gao et al. |
| 2003/0040134 A1 | 2/2003 | Dellwala |
| 2003/0068151 A1 | 4/2003 | Gunn et al. |
| 2003/0174945 A1 | 9/2003 | Fried et al. |
| 2003/0190107 A1 | 10/2003 | Walker |
| 2004/0022474 A1 | 2/2004 | Lim et al. |
| 2004/0037503 A1 | 2/2004 | Hastings et al. |
| 2004/0076362 A1 | 4/2004 | Wong et al. |

FOREIGN PATENT DOCUMENTS

| | | |
|---|---|---|
| EP | 0 751 409 A2 | 1/1997 |
| GB | 2 243 241 A | 10/1991 |
| JP | 63-106605 | 5/1988 |
| JP | 406201934 A | 7/1994 |
| JP | 2001-4877 | 1/2001 |
| WO | WO 02/082134 A1 | 10/2002 |
| WO | WO 02/082146 A1 | 10/2002 |
| WO | WO 03/107051 | 12/2003 |

OTHER PUBLICATIONS

Ogawa, K., W. S. C. Change, B. L. Sopori, and F. J. Rosenbaum, "A Theoretical Analysis of Etched Grating Couplers for Integrated Optics," *IEEE J. Quantum Electron.*, vol. QE-9, No. 1, Jan. 1973, pp. 29-42.

Neviere, M., R. Petit, and M. Cadilhac, "About the Theory of Optical Grating Coupler-Waveguide Systems," *Optics Comm.* vol. 8, No. 2, Jun. 1973, pp. 113-117.

Neviere, M., P. Vincent, R. Petit and M. Cadilhac, "Systematic Study of Resonances of Holographic Thin Film Couplers," *Optics Comm.*, vol. 9, No. 1, Sep. 1973, pp. 48-53.

Neviere, M., P. Vincent, R. Petit and M. Cadilhac, "Determination of the Coupling Coefficient of a Holographic Thin Film Coupler," *Optics Comm.*, vol. 9, No. 3, Nov. 1973, pp. 240-245.

Ulrich, R., "Efficiency of optical-grating couplers," *J. Opt. Soc. Am.*, vol. 63, No. 11, Nov. 1973, pp. 1419-1431.

Marcuse, D., "Exact Theory of TE-Wave Scatterings From Blazed Dielectric Gratings," *The Bell Systems Technical Journal*, vol. 55, No. 9, Nov. 1976, pp. 1295-1317.

Tamir, T. and S. T. Peng, "Analysis and Design of Grating Couplers," *Appl. Phys.*, 14, 235-254 (1977).

Yariv, A. and M. Nakamura, "Periodic Structures for Integrated Optics," *IEEE J. Quantum Electron*, vol. QE-13, No. 4, Apr. 1977, pp. 233-253.

Loewen, E. G. and M. Neviere, "Dielectric coated gratings: a curious property," *Appl. Optics*, vol. 16, No. 11, Nov. 1977, pp. 3009-3011.

Maystre, D., "A new general integral theory of dielectric coated gratings," *J. Opt. Soc. Am.*, vol. 68, No. 4, Apr. 1978, pp. 490-495.

Lee W., and W. Streifer, "Radiation loss calculations for corrugated dielectric waveguides," *J. Opt. Soc. Am.*, vol. 68, No. 12, Dec. 1978, pp. 1701-1707.

Tamir, T. *Integrated Optics*. Chapt 3, Couplers, Springer-Verlag, New York, 1979, pp. 83-137.

Lee W., and W. Streifer, "Radiation loss calculations for corrugated dielectric waveguides. II. TM polarization," *J. Opt. Soc. Am.*, vol. 69, No. 12, Dec. 1979, pp. 1671-1676.

Chang, K. C. and T. Tamir, "Simplified approach to surface-wave scattering by blazed dielectric gratings," *Appl. Opt.* vol. 19, No. 2, Jan. 15, 1980, pp. 282-288.

Chang, K. C., V. Shah and T. Tamir, "Scattering and guiding of waves by dielectric gratings with arbitrary profiles," *J. Opt. Soc. Am.*, vol. 70, No. 7, Jul. 1980, pp. 804-813.

Miyanago, S. and T. Asakura, "Intensity profile of outgoing beams from uniform and linearly tapered grating couplers," *Appl. Opt.*, vol. 20, No. 4, Feb. 15, 1981, pp. 688-695.

Moharam, M. G. and T. K. Gaylord, "Diffraction analysis of dielectric surface-relief gratings," *J. Opt. Soc. Am.*, vol. 72, No. 10, Oct. 1982, pp. 1385-1392.

Gaylord, T. K. and M. G. Moharam, "Analysis and Applications of Optical Diffraction by Gratings," *Proc. IEEE*, vol. 73, No. 5, May 1985, pp. 894-937.

Suhara, T. and H. Nishihara, "Integrated Optics Components and Devices Using Periodic Structures," *IEEE J. Quantum Electronics*, vol. QE-22, No. 6, Jun. 1986, pp. 845-867.

Avrutsky, I. A., A. S. Svakhin and V. A. Sychugov, "Interference phenomena in waveguides with two corrugated boundaries," *J. Modern Optics*, vol. 36, No. 10, 1989, pp. 1303-1320.

Avrutsky, I. A., A. S. Svakhin and V. A. Sychugov, "High-efficiency single-order waveguide grating coupler," *Opt. Lett.*, vol. 15, No. 24, Dec. 15, 1990, pp. 1446-1448.

Li, L. and M. C. Gupta, "Effects of beam focusing on the efficiency of planar waveguide grating couplers," *Appl. Opt.*, vol. 29, No. 36, Dec. 20, 1990, pp. 5320-5325.

Gupta, M. C. and L. Li, "Effect of beam defocus on the efficiency of planar waveguide grating couplers," *Appl. Opt.*, vol. 30, No. 30, Oct. 20, 1991, pp. 4402-4405.

Bates, K. A., L. Li, R. L. Roncone and J. J. Burke, "Gaussian beams from variable groove depth grating couplers in planar waveguides." *Appl. Opt.* vol. 32, No. 12, Apr. 20, 1993, pp. 2112-2116.

Najafi, S. I., M. Fallahi, P. Lefebvre, C. Wu and I. Templeton, "Integrated Optical Circular Grating Tap Power Divider," *Electron. Lett.*, vol. 29, No. 16, Aug. 5, 1993, pp. 1417-1418.

L.C. West et al., "Non-uniform grating couplers for coupling of Gaussian beams to compact waveguides," *Integrated Photonics Research Technical Digest*, Optical Society of America, 1994, 3 pages.

L.C. West, C. Roberts, J. Dunkel, G. Wojcik and J. Mould, "Non-uniform grating couplers for coupling of Gaussian beams to compact waveguides," Preprint of paper for IPR Tech. Dig., OSA, 1994.

Hagberg, M., N. Eriksson, T. Kjellberg and A. Larsson, "Dependence of output grating efficiency on detuning in surface grating output couplers," *Opt. Lett.*, vol. 20, No. 2, Jan. 15, 1995, pp. 180-182.

Moharam, M. G., D. A. Pommet, E. B. Grann and T. K. Gaylord, "Stable implementation of the rigorous coupled-wave analysis for surface-relief gratings: enhanced transmittance matrix approach," *J. Opt. Soc. Am. A*, vol. 12, No. 5, May 1995, pp. 1077-1086.

Schmitz, M., R. Brauer and O. Bryngdahl, "Gratings in the resonance domain as polarizing beam splitters," *Opt. Lett.*, vol. 20, No. 17, Sep. 1, 1995, pp. 1830-1831.

Pascal, D., R. Orobtchouk, A. Layadi, A. Koster and S. Laval, "Optimized coupling of a Gaussian beam into an optical waveguide with a grating coupler: comparison of experimental and theoretical results," *Appl. Opt.*, vol. 36, No. 12, Apr. 20, 1997, pp. 2443-2447.

Fallahi, M., K. J. Kasumic, S. Penner, O. Nordman and N. Peyghambarian, "Design and fabrication of circular grating coupled distributed Bragg reflector lasers," *Opt. Eng.* vol. 37, No. 4, Apr. 1998, pp. 1169-1174.

Sheard, S. J., M. Li and T. D. Liao, "Waveguide Grating Couplers," obtained from www.eng.ox.ac.uk/~holsjs/research/files/Couplers. pdf on Apr. 14, 2003, original date online unknown.

Lalanne, P., J. Hazart, P. Chavel, E. Cambril and H. Launois, "A transmission polarizing beam splitter grating," *J. Opt. A: Pure Appl. Opt.*, vol. 1 (1999), pp. 215-219.

Backlund, J., J. Bengtsson, C. Carlstrom and A. Larsson, "Incoupling waveguide holograms for simultaneous focusing into multiple arbitrary positions," *Appl. Opt.*, vol. 38, No. 27, Sep. 20, 1999, pp. 5738-5746.

Backlund, J., J. Bengtsson, C Carlstrom and A. Larsson, "Multifunctional Grating Couplers for Bidirectional Incoupling into Planar Waveguides," *IEEE PTL*, vol. 12, No. 3, Mar. 2000, pp. 314-316.

Orobtchouk, R., A. Layadi, H. Gualous, D. Pascal, A. Koster and S. Laval, "High-efficiency light coupling in a submicrometric silicon-on-insulator waveguide," *Appl. Opt.*, vol. 39, No. 31, Nov. 1, 2000, pp. 5773-5777.

Moreno, E., E. Emi, C. Hafner and R. E. Kunz, "Theoretical Modeling and Optimization of Integrated Optical Nanostructures," CSEM—Scientific and Technical Report 2000.

Mossberg, T. W., "Planar holographic optical processing devices," *Opt. Lett.* vol. 26, No. 7, Apr. 1, 2001, pp. 414-416.

Backlund, J., J. Bengtsson, C Carlstrom and A. Larsson, "Waveguide Input Grating Coupler for Wavelength-Division Multiplexing and Wavelength Encoding," *IEEE Photon. Tech. Lett.*, vol. 13, No. 8, Aug. 2001, pp. 815-817.

Landru, N., D. Pascal and A. Koster, "Modelling of two-dimensional grating couplers on silicon-on-insulator waveguides using beam propagation method," *Opt. Comm.*, vol. 196, Sep. 1, 2001, pp. 139-147.

Mossberg, T. W., "Lithographic holography in planar waveguides," SPIE's International Technical Group Newsletter. Nov. 2001, vol. 12, No. 2., pp. 7-8.

Backlund, J., J. Bengtsson, C Carlstrom and A. Larsson, "Input waveguide grating couplers designed for a desired wavelength and polarization response," *Appl. Opt.*, vol. 41, No. 15, May 20, 2002, pp. 2818-2825.

Taillert, D., W. Bogaerts, P. Bienstman, T. F. Krauss, P. Van Daele, I. Moerman, S. Verstuyft, K. De Mesel and R. Baets, "An Out-of-Plane Grating Coupler for Efficient Butt-Coupling Between Compact Planar Waveguides and Single-Mode Fibers," *IEEE J. of Quantum Electron*, vol. 38, No. 7, Jul. 2002, pp. 949-955.

Ang, T. W. et al., "Highly efficient unibond silicon-on-insulator blazed grating couplers," *Applied Physics Letters*, vol. 77, No. 25, Dec. 18, 2000, pp. 4214-4216.

Emmons, R.M. et al., "Buried-Oxide Silicon-on-Insulator Structures II: Waveguide Grating Couplers," *IEEE Journal of Quantum Electronics*, vol. 28, No. 1, Jan. 1992, pp. 164-175.

Moharam, M.G. and Gaylord, T.K., "Rigorous coupled-wave analysis of grating diffraction—E-mode polarization and losses," *J. Opt. Soc. Am.*, vol. 73, No. 4, Apr. 1983, pp. 451-455.

Li, L., "Symmetries of cross-polarization diffraction coefficients of gratings," *J. Opt. Soc. Am A.*, vol. 17, No. 5, May 2000, pp. 881-887.

M. Palamaru et al:, "Photonic crystal waveguides: Out-of-plane losses and adiabatic modal conversion," *Applied Physics Letters*, vol. 78, No. 11, Mar. 12, 2001, pp. 1466-1468.

T. Happ et al., "Photonic crystal tapers for ultracompact mode conversion," *Optics Letters*, vol. 26, No. 14, Jul. 15, 2001, pp. 1102-1104.

A. Talneau et al., "Low-reflection photonic-crystal taper for efficient coupling between guide sections of arbitrary widths," *Optics Letters*, vol. 27, No. 17, Sep. 1, 2002, pp. 1522-1524.

Y. Xu et al., "Adiabatic coupling between conventional dielectric waveguides and waveguides with discrete translational symmetry," *Optics Letters*, vol. 25, No. 10, May 15, 2000, pp. 755-757.

E. Yablonovitch, "Photonic band-gap structures," *J. Opt. Soc. Am. B*, vol. 10, No. 2, Feb. 1993, pp. 283-295.

D. Labilloy et al., "Diffraction Efficiency and Guided Light Control by Two-Dimensional Photonic-Bandgap Lattices," *IEEE Journal of Quantum Electronics*, vol. 35, No. 7, Jul. 1999, pp. 1045-1052.

Ph. Lalanne et al., *Modal conversion with artificial materials for photonic-crystal waveguides*, Optics Express, vol. 10, No. 8, Apr. 22, 2002, pp. 354-359.

U.S. Appl. No. 10/242,682, filed Sep. 10, 2002, entitled Structure and Method For Coupling Light Between Dissimilar Waveguides (Luxcal.002A).

U.S. Appl. No. 10/241,284, filed Sep. 9, 2002, entitled Strip Loaded Waveguide With Low-Index Transition Layer (Luxcal.003A).

U.S. Appl. No. 10/242,136, filed Sep. 9, 2002, entitled Strip Loaded Waveguide Integrated With Electronics Components (Luxcal.004A).

U.S. Appl. No. 10/242,314, filed Sep. 10, 2002, entitled Tunable Resonant Cavity Based on the Field Effect in Semiconductors (Luxcal.005A).

U.S. Appl. No. 10/242,313, filed Sep. 10, 2002, entitled Modulator Based on Tunable Resonant Cavity (Luxcal.006A).

U.S. Appl. No. 10/241,285, filed Sep. 9, 2002, entitled Electronically Biased Strip Loaded Waveguide (Luxcal.012A).

* cited by examiner

TUNING THE INDEX OF A WAVEGUIDE STRUCTURE

PRIORITY APPLICATION

This application claims priority under 35 U.S.C. § 119(e) from U.S. Provisional Patent Application Ser. No. 60/318, 486, entitled "Tunable Resonant Cavity Based on the Field Effect In Semiconductors," filed Sep. 10, 2001, U.S. Provisional Patent Application Ser. No. 60/327,137, "High Speed Optical Modulator Based on CMOS Compatible Tunable Resonant Cavity" filed Oct. 4, 2001, and U.S. Provisional Application Ser. No. 60/328,474, entitled "Technique for Tuning the Index of an Optical Structure and Use of this Effect for Tuning the Coupling," filed Oct. 11, 2001, as well as U.S. Provisional Patent Application Ser. No. 60/318,445 entitled "SOI Waveguide with Polysilicon Gate" and filed Sep. 10, 2001, each of which is hereby incorporated herein by reference in its entirety.

BACKGROUND OF THE INVENTION

1. Field of the Invention

The present invention is directed to semiconductor devices, and more particularly to controlling the propagation of photons through semiconductor structures.

2. Description of the Related Art

Light offers many advantages when used as a medium for propagating information, the foremost of which are increased speed and bandwidth. In comparison with electrical signals, signals transmitted optically can be switched and modulated faster and can include an even greater number of separate channels multiplexed together. Accordingly, lightwave transmission along optical fibers is widespread in the telecommunications industry. In an exemplary fiber optic communication system, a continuous wave (CW) beam of light may be emitted from a laser diode and modulated using an electro-optical modulator that is driven by an electrical signal. This electrical signal may correspond to voice or data which is to be transmitted over a distance between, e.g., two components in a computer, two computers in a network, or two phones across the country or the world. The light travels in an optical fiber to a location where it is detected by an optical sensor, which outputs voltage that varies in accordance with the modulation of the optical beam. In this manner, information can be rapidly transported from one location to another. To increase data throughput numerous optical signals at different wavelengths can be multiplexed and transmitted together along a single optical path. This optical path can be switched selectively and varied to direct the optical signals to the appropriate destination.

In constructing optical systems, such as the one described above, a variety of functionalities are desirable. One useful element is a modulator for varying a specific property of light such as amplitude or phase. Another valuable component is a tunable filter for selectively isolating certain optical frequencies. Additional useful elements are couplers and switches for controllably transferring light from one path to another. What is needed are advantageous designs and techniques for modulating and filtering light as well as for coupling and switching optical signals from one path to another.

SUMMARY OF THE INVENTION

In one aspect of the invention, an apparatus comprises a waveguide, a tunable resonant cavity, and first and second electrodes. The tunable resonant cavity comprises a closed path for propagating electromagnetic waves, the close path comprising a semiconductor having a distribution of free carriers. The closed path is juxtaposed with the waveguide to permit the coupling of electromagnetic waves between the waveguide and the closed path. The first and second electrodes are positioned to apply an electric field through an insulator into the semiconductor of the tunable resonant cavity. The distribution of free carriers in the semiconductor is responsive to the electric field to vary phase delay introduced by the closed path.

In another aspect of the invention, an optical apparatus also comprises a waveguide, a tunable resonant cavity, and first and second electrodes. The tunable resonant cavity comprises a semiconductor having a distribution of free carriers and a substantially circular optical path. The circular optical path is juxtaposed with the waveguide to permit the coupling of light between the waveguide and the circular optical path. The first and second electrodes are positioned to apply an electric field through an insulator into the circular optical path. The distribution of free carriers in the circular optical path is responsive to the electric field to vary the optical path length of the circular optical path.

Still another aspect of the invention comprises a method of tuning a resonant cavity. In this method an optical resonator comprising semiconductor is provided and an electric field is applied through an insulator to at least a portion of the semiconductor to alter free carrier distribution in said semiconductor. The resonant frequency of the optical resonator is thereby changed from a first frequency to a second frequency.

Yet another aspect of the invention comprises an optical apparatus comprising a first waveguide, a second waveguide, a semiconductor and first and second electrodes for applying an electric field through an insulator to the semiconductor. The semiconductor provides an optical path between the first and second waveguides to couple light between the waveguides. The adjustment of the electric field changes the free carrier density in the optical path such that absorption of light in the optical path increases, thereby decreasing the coupling of light between the first and second waveguides.

Another aspect of the invention comprises an optical switching apparatus comprising first and second waveguides and a carrier controlled optical switch having at least first and second states. The carrier controlled optical switch comprises a coupling waveguide which provides an optical path between said first and second waveguides and first and second electrodes. The coupling waveguide provides an optical path between the first and second waveguides. The coupling waveguide comprises a semiconductor having a refractive index dependent on a distribution of free carriers within the semiconductor. The first and second electrodes are for applying an electric field through an insulator into the semiconductor. The distribution of free carriers is responsive to application of the electric field to change the state of the carrier controlled optical switch from the first state to the second state.

Another aspect of the invention comprises a method of selectively coupling light between first and second waveguides. The method comprises providing a semiconductor positioned to couple light between the waveguides along an optical path and changing free carrier density of the semiconductor in the optical path to alter coupling between the waveguides.

Still another aspect of the invention comprises an optical waveguide coupler having a tunable coupling coefficient.

The coupler comprises a first waveguide and a second waveguide juxtaposed for coupling and a first electrode. The first waveguide is comprised of semiconductor having a distribution of free carriers. The first electrode is electrically connected to a first variable voltage source for applying an electric field to the semiconductor of the first waveguide. The distribution of free carriers is responsive to application of the electric field to change the coupling coefficient between the waveguides from a first value to a second value.

Still another aspect of the invention comprises a method of tuning the coupling coefficient of an optical waveguide coupler. In this method, a first waveguide comprising semiconductor containing a distribution of free carriers is provided. A second waveguide juxtaposed to the first waveguide is also provided. An electric field is applied to the semiconductor of the first waveguide to alter the free carrier distribution in the semiconductor, thereby changing the coupling coefficient of the optical waveguide coupler from a first value to a second value.

Yet another aspect of the invention comprises a waveguide grating comprising a waveguide for propagating light in a longitudinal direction. The waveguide comprises a plurality of elongate members oriented transverse to the longitudinal direction. The members are disposed relative to the waveguide to form a grating for coupling light out of the waveguide. The waveguide has a carrier density at each of the members. These members include respective electrodes for applying an electric field to the waveguide, the electric field varying this carrier density in the waveguide such that the coupling is altered.

BRIEF DESCRIPTION OF THE DRAWINGS

Preferred embodiments of the present invention are described below in connection with the accompanying drawings.

DETAILED DESCRIPTION OF THE PREFERRED EMBODIMENT

Figure 1:
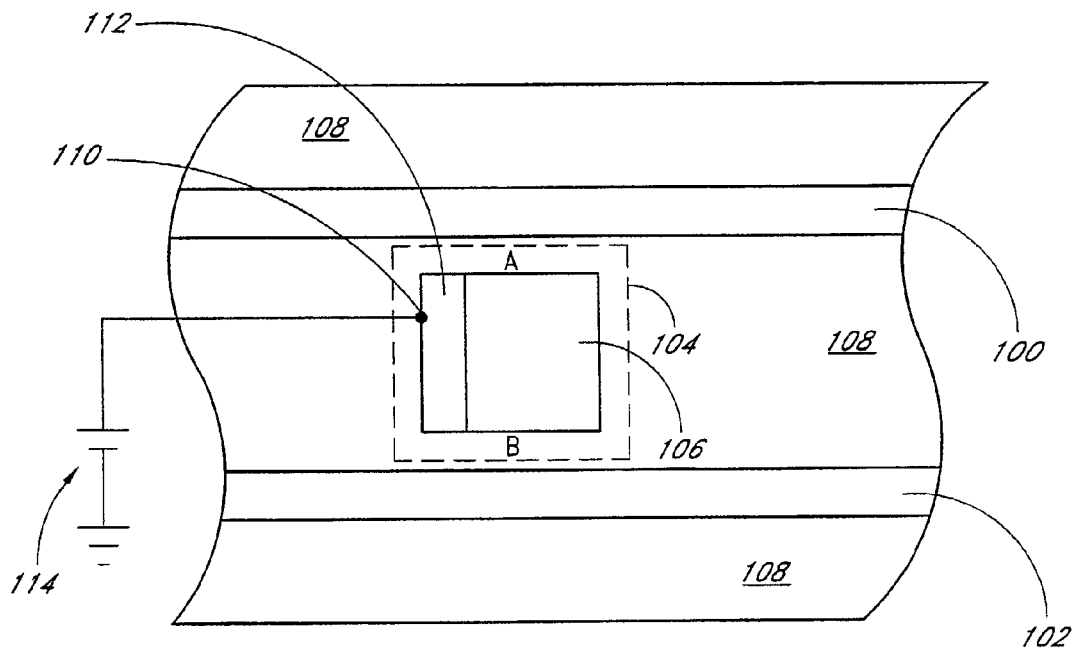
FIG. 1 is a schematic illustration of an embodiment of an optical switching apparatus including a carrier controlled optical switch comprising a resonant cavity disposed between two waveguides.

These and other embodiments of the present invention will also become readily apparent to those skilled in the art from the following detailed description of the preferred embodiments having reference to the attached figures, the invention not being limited to any particular embodiment(s) disclosed. Accordingly, the scope of the present invention is intended to be defined only by reference to the appended claims.

In general, optical waveguides comprise a core region comprising material that is at least partially transparent. This core region is surrounded by a cladding region that confines light within the core region. Some optical energy, often referred to as the evanescent energy or the evanescent field, however, may exist outside the core region and within the cladding region.

In certain waveguides, the core region comprises a first medium having a first refractive index, and the cladding region or cladding comprises a second medium having a second refractive index, the refractive index of the core region being greater than the refractive index of the cladding region. A core/cladding interface is located at the boundary between the core region and the cladding region. In such embodiments, when light in the core region is incident upon this core/cladding interface at an angle greater than the critical angle, the light is reflected back into the core region. This effect is referred to as total internal reflection. In this manner, optical signals can be confined within the core region due to total internal reflection at the core/cladding interface.

Waveguides can be fabricated in a wide variety of geometries and configurations. A channel waveguide, and more specifically, a buried channel or embedded strip waveguide, is a specific type of waveguide that fits the description above. A channel waveguide generally comprises a core comprising a first medium having a relatively high refractive index surrounded by a relatively lower refractive index cladding region. A buried channel or embedded strip waveguide generally comprises a core embedded in a substrate that forms at least part of the surrounding cladding region.

A buried channel waveguide is an example of an integrated optical waveguide, which are generally associated with a substrate. The integrated optical waveguide may for example be situated on the substrate, in a substrate, or partially on and partially in the substrate. The integrated optical waveguide may be part of the substrate itself but preferably comprises one or more layers of material positioned on a surface of the substrate. Examples of integrated optical waveguides include the channel waveguides discussed above, as well as slab waveguides, rib or ridge waveguides, and strip loaded waveguides.

In accordance with conventional usage in the art, optical components that are integrated onto a substrate with integrated optical waveguides, are collectively referred to herein as integrated optics. Such optical component may for example, process, manipulate, filter or otherwise alter or control optical signals propagating within the waveguides. As discussed above, these components themselves may be waveguides that guide light.

One of the simplest integrated optical waveguide configurations is the conventional slab waveguide. The slab waveguide comprises a thin, planar slab surrounded by cladding regions. The cladding regions may take the form of first and second (for example, upper and lower) cladding layers on either side of the slab. The two cladding layers need not comprise the same material. In this simplified example, the slab may be planar with substantially parallel planar boundaries at the interfaces with the first and second cladding layers. Generally, the slab has a higher refractive index than either of the cladding layers. Light can therefore be confined in one dimension (e.g., vertically) within the slab. In this configuration of the slab waveguide, optical energy is not confined laterally to any portion of the slab, but extends throughout the slab due to total internal reflection at the planar boundaries between the slab and the surrounding upper and lower cladding layers.

A ridge or rib waveguide is formed by creating thickness variations in the slab. These thickness variations may be formed by depositing material on selected regions of the slab or by removing material from selected regions of the slab. The slab with the ridges or ribs formed thereon may be surrounded on opposite sides by the first and second (e.g., upper and lower cladding layers) comprising relatively low refractive index material. The thicker portions, i.e., the ridges or ribs, which comprise more slab material, will have a higher effective index than thinner region of the slab which comprise relatively lesser amounts of the slab material.

Accordingly, the region within the slab that is beneath the thicker portions and in proximity thereto has a higher effective refractive index than other portions of the slab. Thus, unlike the slab waveguide wherein optical energy propagates throughout the planar slab, the ridge or rib waveguide substantially confines optical energy to the region of the planar slab layer within and under the ridge and in proximity thereto. In a ridge or rib waveguide, therefore, an optical signal can be propagated along a path in the slab defined by the region under which the ridge or rib is located on the slab. Thus, ridge waveguides defining any number and variations of optical pathways can be created by forming one or more ridges or ribs in the slab having the shape and orientation of the desired optical pathways.

Similarly, a strip loaded waveguide is formed by positioning a strip on the slab of a slab waveguide. The slab and the strip located thereon may be surrounded on opposite sides by the first and second (e.g., upper and lower) cladding layers having lower refractive index than the slab. Preferably, the strip has a refractive index that is greater than that of either cladding layer, however, the index of the strip is preferably approximately equal to that of the slab. The presence of the strip positioned on the slab induces an increase in effective index of the slab in the region beneath the strip and in proximity thereto.

As with the ridge or rib waveguide, the region within the slab that is beneath the strip and in proximity thereto has a higher effective refractive index than other portions of the slab. Thus, the strip loaded waveguide substantially can confine optical energy to the region of the planar slab layer under the high-index strip, some of the optical energy also being within the strip itself. Accordingly, in a strip loaded waveguide an optical signal can be propagated along a path in the slab defined by the region over which the high-index strip is placed on the slab. Waveguides corresponding any number and variations of optical pathways, can be created by depositing one or more strips onto the slab having the shape and orientation of the desired optical pathways.

Another form of waveguide discussed in U.S. patent application Ser. No. 10/241,284 entitled "Strip Loaded Waveguide with Low-Index Transition Layer" filed Sep. 9, 2002, which is hereby incorporated herein by reference in its entirety, comprises a slab having a first refractive index $n_1$ and a strip having a second refractive index $n_2$. In addition, the strip loaded waveguide structure has a transition layer having a third refractive index $n_3$. The transition layer is positioned between the slab and the strip, such that the slab and the strip do not directly contact each other. The refractive index of the transition layer $n_3$ is less than the refractive index of the slab $n_1$ and the refractive index of the strip $n_2$.

The light within the slab is confined to portions beneath the strip because of the presence of the strip, despite the fact that the strip is separated from the slab. The intervening transition layer does not prevent the strip from determining the shape and location of the optical mode(s) supported in the slab. The presence of the strip positioned proximally to the slab portion induces an increase in effective index of the slab portion in the region directly under the strip and in proximity thereto. This increase in effective index defines a relatively high effective index guiding region wherein light in one or more supported optical modes is guided along the strip loaded waveguide. The strip loaded waveguide guides supported modes in the guiding region despite the presence of the transition layer between the slab and strip. In particular, the transition layer does not prevent the strip from altering the effective index within the slab and more particularly, from raising the effective index within the slab. Preferably, the transition layer has a thickness sufficiently small such that the strip can increase the effective index of the slab in regions immediately beneath and in the proximity thereto. The transition layer is sufficiently thin and the strip and the slab are sufficiently close, although physically separated by the intervening transition layer, that the strip can affect the propagation of light within the slab. The transition layer also preferably has an index of refraction that is low in comparison with that of the strip and the slab.

In certain embodiments of the invention, semiconductor materials used in conventional processes for fabrication of semiconductor microelectronics are employed to create waveguide structures. These materials include, but are not limited to, crystalline silicon, polysilicon and silicon dioxide (SiO$_2$). In particular, in various preferred embodiments of the strip load waveguide having an insulating transition layer, the slab comprises single crystal silicon, the transition layer comprises silicon dioxide, and the strip comprises polysilicon, although in other embodiments, the strip may comprise crystal silicon. The crystal silicon slab and the polysilicon strip are preferably doped so as to be electrically conducting although in portions of the slab or strip that are not to be conductive, the slab and the strip are preferably undoped to minimize absorption losses.

As is well known, single crystal silicon is used to fabricate semiconductor microelectronics and integrated circuits (ICs), such as microprocessors, memory chips and other digital as well as analog ICs, and thus single crystal silicon is well characterized and its properties are largely well understood. The term single crystal silicon is used herein consistently with its conventional meaning. Single crystal silicon corresponds to crystalline silicon. Single crystal silicon, although crystalline, may include defects such that it is not truly a perfect crystal, however, silicon having the properties conventionally associated with single crystal silicon will be referred to herein as single crystal silicon despite the presence of such defects. The single crystal silicon may be doped either p or n as is conventional.

Single crystal silicon should be distinguished from polysilicon or "poly". Polysilicon is also used to fabricate semiconductor microelectronics and integrated circuits. The term polysilicon or "poly" is used herein consistently with its conventional meaning. Polysilicon corresponds to polycrystalline silicon, silicon having a plurality of separate crystalline domains. Polysilicon can readily be deposited for example by CVD or sputtering techniques, but formation of polyslicon layers and structures is not to be limited to these methods alone. Polysilicon can also be doped p or n and can thereby be made substantially conductive. In general, however, bulk polysilicon exhibits more absorption losses in the near infrared portion of the spectrum than a similar bulk single crystal silicon, provided that the doping, temperature, and other parameters are similar.

Optical switches, modulators, and couplers, among other devices, can be implemented using various waveguide structures including but not limited to the types discussed above, e.g., channel, slab, rib or ridge, strip-loaded, and strip loaded with transition layer. In addition, these structures can be formed using semiconductor materials, such as for example, silicon.

A. Optical Switching Apparatus

FIG. 1 is a schematic diagram of an optical switching apparatus. The switching apparatus includes a carrier controlled optical switch 104 that may be used to couple light between a first waveguide 100 and a second waveguide 102.

The effective refractive index of the first and second waveguides 100, 102 is larger than the effective refractive index of cladding regions 108 surrounding the waveguides so as to allow the waveguides 100, 102 to propagate light in a guided fashion, as discussed above.

The carrier controlled optical switch 104 includes an optical path between the first waveguide 100 and the second waveguide 102. In various preferred embodiments, the optical path comprises a resonant cavity 106, preferably comprised of an optically transparent semiconductor. More particularly, this resonant cavity 106 preferably comprises a waveguide structure comprising semiconductor material. The optical path further comprises a first gap region, A, between the first waveguide 100 and the resonant cavity 106, and a second gap region, B, between the second waveguide 102 and the resonant cavity 106. The sizes of the gap regions, A, B, permits control of the coupling of light between waveguides 100, 102 and the resonant cavity 106, and allows for a weak coupling of light, which is desirable under certain conditions.

Preferably, the resonant cavity 106 is configured to accumulate or deplete free carriers such as electrons and/or holes. The refractive index of the material comprising the resonant cavity 106 is significantly larger than the refractive index of the confining region 108 enabling light to be guided within the resonant cavity. Furthermore, the refractive index of at least a particular region within the semiconductor 106 is variable, depending upon the density of free carriers in that region.

The resonant cavity 106 further includes an electrode 110 for applying an electric field through an insulator 112 into the semiconductor 106. (The insulator preferably comprises silicon dioxide.) The electrode 110 is preferably metal or polysilicon, and is connected to a variable voltage source 114 that may be used to control the magnitude of an electric field applied to the semiconductor 106.

These waveguides 100, 102 as well as the resonant cavity 106 depicted schematically in FIG. 1, may comprise channel waveguides, rib or ridge waveguides, or strip loaded waveguides although the waveguide design should not be limited to these specific types. In one preferred embodiment, however, the waveguides 100, 102 comprise strip loaded waveguides having a low-index transition layer between the strip and the slab described above as well as disclosed in in U.S. patent application Ser. No. 10/241,284 entitled "Strip Loaded Waveguide with Low-Index Transition Layer" filed Sep. 9, 2002.

These particular strip loaded waveguides comprises comprises a slab and a strip, wherein the strip is separated from the slab. A layer of material having an index of refraction lower than that of the strip and the slab is disposed between and separates the strip and the slab. Nevertheless, a guiding region is provided for propagating an optical mode and this guiding region extends both within the strip and the slab. In certain embodiments, for example, the slab and strip comprise semiconductor and the transition region comprises dielectric.

Application of a voltage between the semiconductor strip and the slab causes carriers to accumulate within the guiding region of the strip loaded waveguide. For example, depending on the polarity of the applied voltage and the doping, electrons or holes may accumulated or be depleted within the semiconductor slab in a regions adjacent to the thin transition layer comprising dielectric material. The structure acts like a capacitor, charging with application of a voltage. The voltage creates an electric field across the thin transition layer with carriers accumulating (or depleting) adjacent to this transition layer.

These strip loaded waveguides are preferably located on a supporting structure or substrate. The supporting structure serves to support the strip loaded waveguide and preferably comprises a material such as silicon or sapphire. Additionally, the supporting structure may also include a cladding layer or layers, which aid in confining optical energy within the slab portion. Accordingly, this cladding preferably has a refractive index that is low in comparison to the refractive index of the slab.

In one preferred embodiment, the supporting structure comprises a silicon substrate having a cladding layer of silicon dioxide formed thereon. The silicon dioxide layer on the silicon substrate with an index of approximately 1.5 serves as a lower cladding layer for the slab. This silicon substrate may be doped.

Accordingly, the slab is disposed either on the substrate or on a layer (preferably the cladding) formed over the substrate. This cladding layer itself may be formed directly on the substrate or may be on one or more layers formed on the substrate. As discussed above, the slab preferably comprises single crystal silicon and has an index of refraction $n_1$ on average of about 3.5 and a thickness $t_1$ preferably between about $$\frac{\lambda}{6n}$$

and $$\frac{\lambda}{4n},$$

and more preferably about $$\frac{\lambda}{4n}.$$

This thickness, $t_1$, determines in part the optical mode or modes supported by the strip loaded waveguide and depends partially on the geometry of the structure. In alternative embodiments, the slab may comprise materials other than single crystal silicon and may be doped or undoped and thus may have different refractive indices. The slab, however, preferably comprises crystal silicon. Localized doping, such as used to create the source, drain, and channel regions in a transistor, may cause the index of refraction in localized regions of the slab to vary slightly.

In general, the strip is disposed above and in a spaced-apart configuration with respect to the slab. The strip may comprise doped polycrystalline silicon having an index of refraction $n_2$ of approximately 3.5. In alternative embodiments, the strip may comprise doped single crystal silicon having an index of refraction $n_2$ on average about 3.5. As discussed above, however, the strip may also be undoped and may comprise materials other than polysilicon or crystal silicon although these materials are preferred. An example of one such alternative material that may be used to form the strip is silicon nitride, which has an index of refraction of approximately 1.9.

The dimensions of the strip may vary and depend in part on the overall composition and geometry of the waveguide. As with the slab, the size of the strip determines in part the number of modes to be supported by the waveguide and the wavelength of these modes.

The transition layer is positioned between the slab and the strip. Preferably, the refractive index of the transition layer is less than the refractive index of the polysilicon strip and the crystalline silicon slab. In one preferred embodiment, the transition layer comprises silicon dioxide having an index of refraction $n_3$ of approximately 1.5.

The strip loaded waveguide is preferably covered at least partially by a coating although more than one coating or layers may be formed on the waveguide in various embodiments. This coating may provide electrical insulation between separate conductive pathways. The coating may also serve as a cladding layer, providing confinement of optical energy within the slab and the strip. Accordingly, the coating or coatings preferably has a composite index of refraction lower than that of the slab and the strip. The coating may have an index of refraction equal to that of the low-index transition layer and may comprise the same material as the low-index transition layer. Alternatively, the coating may have a different index of refraction than the transition layer and may comprise different material. The coating preferably comprises silicon dioxide. Other materials and, more specifically, other dielectrics may also be employed.

Confinement of light within the slab is provided because the slab has a higher refractive index than the layers above and below. In one preferred embodiment, for example, light is confined within the silicon slab because the silicon slab has a higher refractive index than the silicon dioxide coating covering it. In addition, the silicon slab has a higher index than the silicon dioxide cladding layer immediately below it. Lateral confinement within the slab is provided by the loading caused by the strip.

In this manner, light can be propagated through specific guiding regions within the slab. The guiding region corresponds to a boundary where a specific portion of the optical energy within the mode, preferably the fundamental mode, is substantially contained and thus characterizes the shape and spatial distribution of optical energy in this mode. Accordingly, the guiding region corresponds to the shape and location of the optical mode or modes in this strip loaded waveguide. In the guiding region, the electric field and the optical intensity are oscillatory, whereas beyond the guiding region, the evanescent field exponentially decays.

As discussed above, these strip loaded waveguides may be employed to form resonant optical cavities, however, the resonant optical cavities disclosed herein are only exemplary and different designs and material systems, both those well known or yet to be devised, may be utilized in the alternative to create resonant optical cavities, modulators, couplers, switches or other related components.

B. Resonant Optical Cavity

Figure 2:
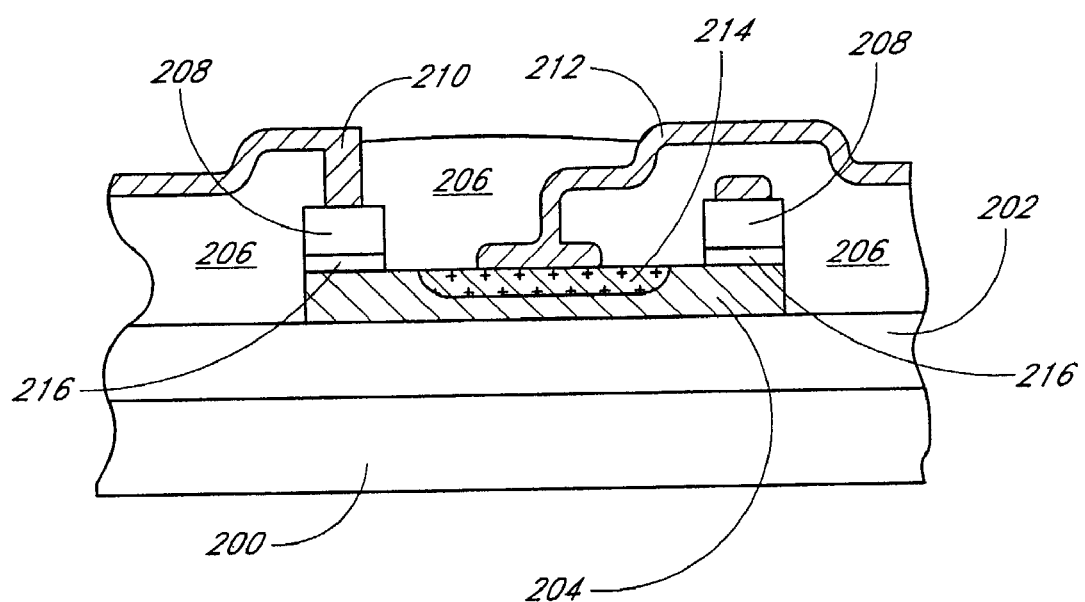
FIG. 2 is a cross-sectional view of a preferred embodiment of a resonant optical cavity formed with a disk-shaped semiconductor.
Figure 3:
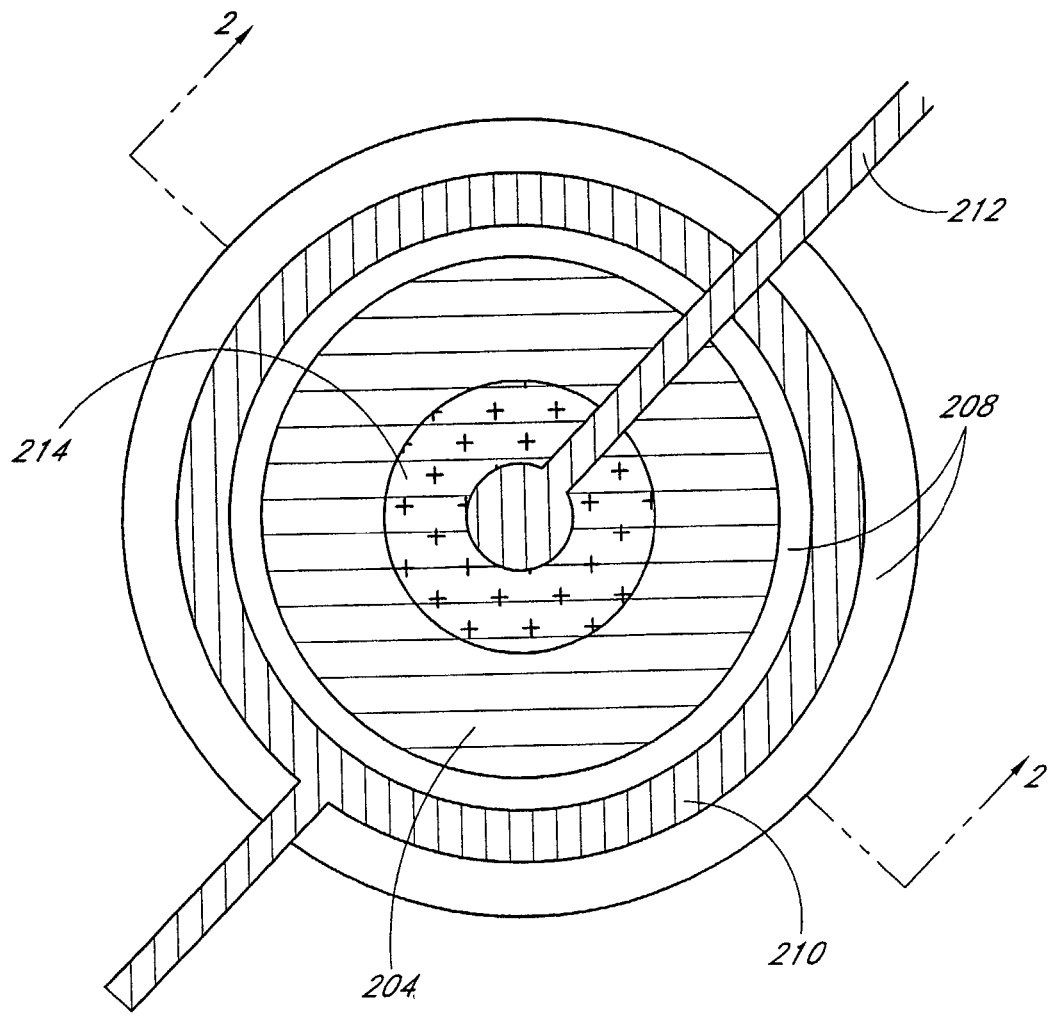
FIGS. 3 and 4 are top and perspective views, respectively, of the resonant optical cavity of FIG. 2.
Figure 4:
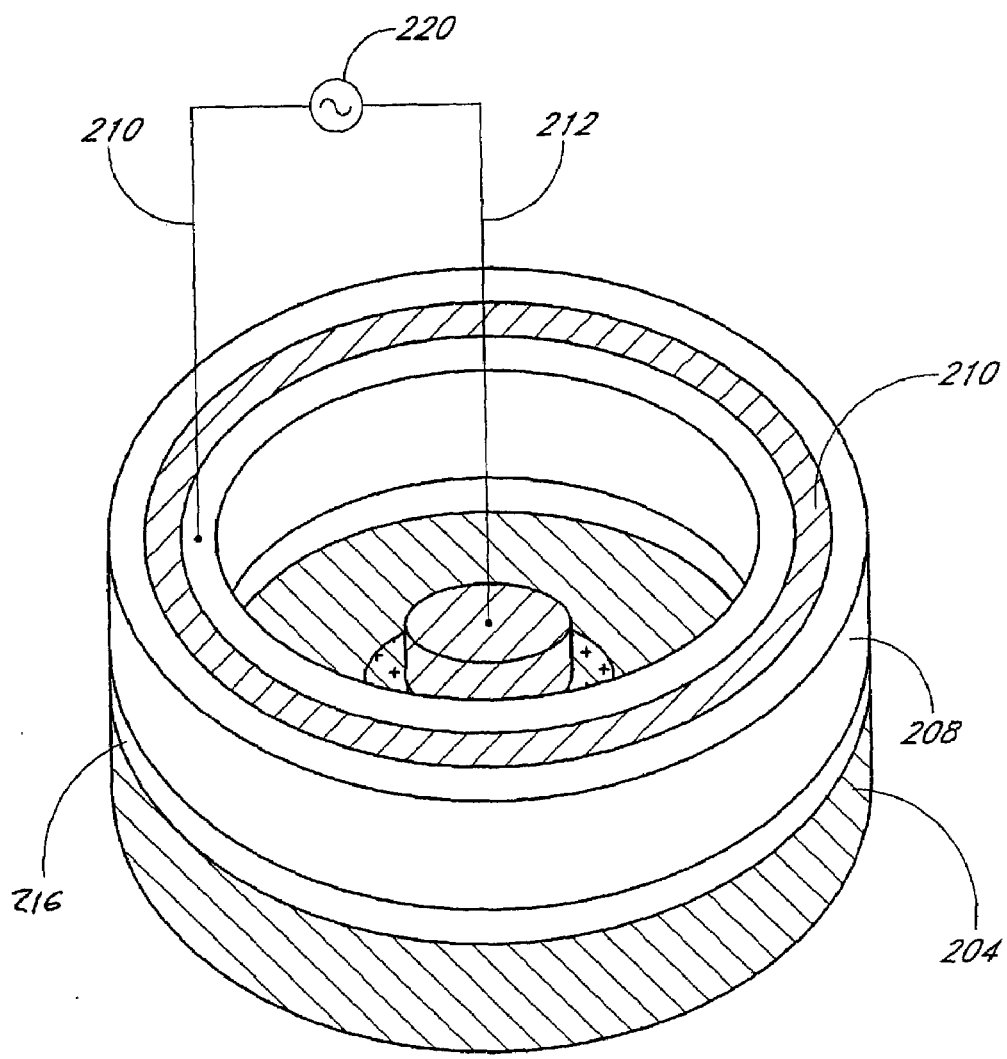

A preferred embodiment of the resonant cavity 106 is illustrated in FIGS. 2 through 4. FIG. 2 is vertical cross-section through the line 2—2 shown in FIG. 3. FIGS. 3 and 4 are top and perspective views of the resonant cavity 106, respectively. FIGS. 2, 5, 11, and 20, depict designs that include conformal metalization. Alternatively, planarization techniques can be used as is conventional in contemporary semiconductor device fabrication.

The resonant cavity 106 comprises a disk-shaped slab 204 on top of a cladding layer 202 formed on a substrate 200. The disk-shaped slab 204 preferably has higher index of refraction than the cladding layer 202. In one preferred embodiment, the disk-shaped slab comprises crystal silicon (e.g., active crystal silicon) and the cladding layer 202 comprises a silicon dioxide layer (e.g., a buried-oxide layer) on a silicon substrate.

An insulating layer 206 covers the disk-shaped slab 204. The insulating layer 206 preferably has a refractive index lower than the refractive index of the disk-shaped slab 204, so as to act as an upper cladding layer confining light within the disk-shaped slab 204. The insulating layer 206 preferably comprises silicon dioxide, which has a refractive index substantially lower than the refractive index of single crystal silicon. The insulating layer 206 also prevents unwanted flow of electrical current between conducting elements of the device. The insulating layer 206 may comprise a plurality of layers, preferably low index dielectrics films overlaying on each other. Those of skill in the art would recognize that other insulating materials such as polymers like polyamide may be used, provided they have appropriate optical properties.

An annular strip 208 comprising relatively high refractive index material is disposed over but space apart from the slap 204. This annular strip 208 follows a path around the outer portion of the disk-shaped slab 204. The annular strip 208 preferably comprises material having an index of refraction that is high compared to that of the insulating layer 206 covering the disk-shaped slab 204. This material comprising the strip 208 is also preferably substantially transparent and non-absorbing to the wavelength light for which the resonant cavity 106 is designed. Preferably, the strip material is substantially conductive and may comprise doped semiconductor. In one preferred embodiment, the annular strip 208 comprises doped polysilicon, which has a refractive index comparable to that of single crystal silicon. Alternatively, the strip 208 may comprise single crystal silicon. Those of skill in the art would recognize that other materials may be used for the strip 208. The materials preferably have a substantially high refractive index in comparison with the insulating material covering the disk-shaped slab 204.

The strip 208 is separated from the disk-shaped slab 204 by a transition layer 216 of the insulating material to prevent the flow of current between the strip 208 and the disk-shaped slab 204 to thereby facilitate carrier accumulation and depletion. This insulating material preferably has a lower index of refraction than the disk-shaped slab 204 as well as the annular shaped strip 208. This transition layer 216 preferably has sufficiently thickness such that the carriers do not traverse this barrier either through defects (e.g., "pin hole" defects) or by tunneling. Conversely, the thickness of this dielectric layer 216 is preferably not so large as to require an excessively highly voltage to be applied to the device to generate or deplete the desired amount of carriers. In one preferred embodiment, this transition layer 206 comprises silicon dioxide.

As shown in FIG. 2, the resonant cavity 106 further includes a first (strip) electrode 210 electrically connected to the annular strip 208. As shown in FIGS. 3 and 4, the first electrode 210 includes a substantially annular portion that is electrically connected to a voltage source 220. This voltage source may be an AC or DC voltage supply depending on the particular application. This embodiment further includes a second (slab) electrode 212 electrically coupled to a central top surface of the disk-shaped slab 204. This central portion of the disk-shaped slab 204 preferably includes a doped region 214 electrically contacting the slab electrode 212 so as to create an ohmic contact between the disk-shaped slab 204 and the slab electrode 212. As illustrated in FIG. 4, the second electrode 212 is also electrically coupled to the voltage source 220 allowing for the application of a potential difference between the strip and slab electrodes 210, 212 although other configurations for establishing an electric field across the transition layer 216 are possible. The strip and slab electrodes 210, 212 are separated by the insulating layer 206 to prevent unwanted electrical contact therebetween; see FIG. 2. The insulating layer 206 is not shown in FIGS. 3 and 4 in order to allow illustration of the interior features of the resonant cavity structure 106. The strip and slab electrodes 210, 212 preferably are comprised of metal, although one of skill in the art would recognize that other materials, such as doped polysilicon, may be used. Salicide may also be included to formed a favorable electrical contact to semiconductor regions. In particular, ohmic contacts can be formed between a metal electrode and an underlying salicide region in the semiconductor. In this manner, for example, the slab electrode 212 can be electrically connected to the semiconductor slab 204.

As discussed above, the strip 208 will confine the light to regions within the slab 204 beneath the strip and in proximity thereto as a result of the effect of the strip on the effective index of the slab. A portion of the optical power will also be contained within the strip 208 as well as the transition layer 216. The thickness of the slab 204 and the strip 208 as well as the width of the strip will in part determine the optical mode or modes that are supported, their spatial extent, and the associated wavelengths. Preferably, these dimensions are selected so as to support a single mode such as the "whispering gallery" mode which travels within the disk shaped slab 204 around its perimeter.

The first electrode 210 is also preferably about as wide as the width of the optical mode confined below the strip 208. The surface area of the first electrode 210 for a resonator with a free spectral range equivalent to approximately a 50 nanometers (nm) optical communications band and supporting the resonator mode for a given wavelength is roughly a few square microns. This small size for the first electrode 210 allows for very high speed modulation due to the small associated capacitance.

The structure 106 shown in FIGS. 2–4 may be manufactured using conventional integrated circuit fabrication processes. For instance, the supporting structure may comprise a commercially available silicon wafer with silicon dioxide formed thereon. Conventional "Silicon-on Oxide" (SOI) processes can be employed to form the silicon slab on the silicon wafer or on a sapphire substrate. Fabrication techniques for forming a crystal silicon layer adjacent an insulator include, but are not limited to, bonding the crystal silicon on oxide, SIMOX (i.e., use of ion implantation to form oxide in a region of single crystal silicon), or growing silicon on sapphire. Oxide formation on the silicon slab can be achieved with conventional techniques used in field effect transistor (FET) technology for growing gate oxides on a silicon active layers. Still other processes utilized in fabricating FETs can also be applied. In the same fashion that a polysilicon gate is formed on the gate oxide in field effect transistors, likewise, a polysilicon strip can be formed over the oxide transition region in the waveguide structure. This polysilicon strip can be patterned using well-known techniques such as photolithography and etching. Damascene processes are also considered possible. Accordingly, conventional processes such as those employed in the fabrication of Complementary Metal Oxide Semiconductor (CMOS) transistors can be used to create the resonant cavity 106. In other embodiments, crystalline silicon strips can be formed on the transition oxide region using conventional techniques such as SOI processing.

Another strategy for fabricating the strip loaded waveguide is to obtain a commercially available SOI wafer which comprises a first silicon substrate having a first silicon dioxide layer thereon with a second layer of silicon on the first silicon dioxide layer. The aggregate structure therefore corresponds to $Si/SiO_2/Si$. The first silicon dioxide layer is also referred to as the buried oxide or BOX. A second silicon dioxide layer can be formed on the SOI wafer and polysilicon or silicon strips can be formed on this structure to create the resonant cavity 106 with the second silicon layer corresponding to the disk-shaped slab 205 and the second silicon dioxide layer formed thereon corresponding to the insulating transition layer. The thickness of this second silicon dioxide transition layer can be controlled as needed. The polysilicon or silicon strips can be patterned for example using photolithography and etching. Damascene processes are also envisioned as possible.

In the case where the substrate does not comprise silicon with a layer of silicon dioxide on the surface, a slab comprising crystal silicon can still be fabricated. For example, crystalline silicon can be grown on sapphire. The sapphire may serve as the lower cladding for the slab. Silicon nitride formed for example on silicon can also be a cladding for a silicon slab. The formation of the transition layer and the strip on the silicon slab can be performed in a manner as described above.

Other conventional processes for forming layers and patterning may also be used and are not limited to those specifically recited herein. Employing conventional processes well known in the art is advantageous because the performance of these processes is well established. SOI and CMOS fabrication processes, for example, are well developed and well tested, and are capable of reliably producing high quality products. The high precision and small feature size possible with these processes should theoretically apply to fabrication of strip-loaded waveguides as the material systems are similar. Accordingly, extremely small sized waveguide structures and components should be realizable, thereby enabling a large number of such waveguides and other components to be integrated on a single die. Although conventional processes can be employed to form the waveguides described herein, and moreover, one of the distinct advantages is that conventional semiconductor fabrication processes can readily be used, the fabrication processes should not be limited to only those currently known in art. Other processes yet to be discovered or developed are also considered as possibly being useful in the formation of these structures.

One additional advantage of these designs is that in various embodiments electronics, such as transistors, can be fabricated on the same substrate as the waveguide structures. Integration of waveguides and electronics on the same substrate is particularly advantageous because many systems require the functionality offered by both electronic, optical, electro-optical, and optoelectronic components. For example, resonant cavities, modulators, switches, and other waveguide structures, can be optically connected together in a network of waveguides and electrically connected to control and data processing circuitry all on the same die. The integration of these different components on a single die is particularly advantageous in achieving compact designs.

Figure 5:
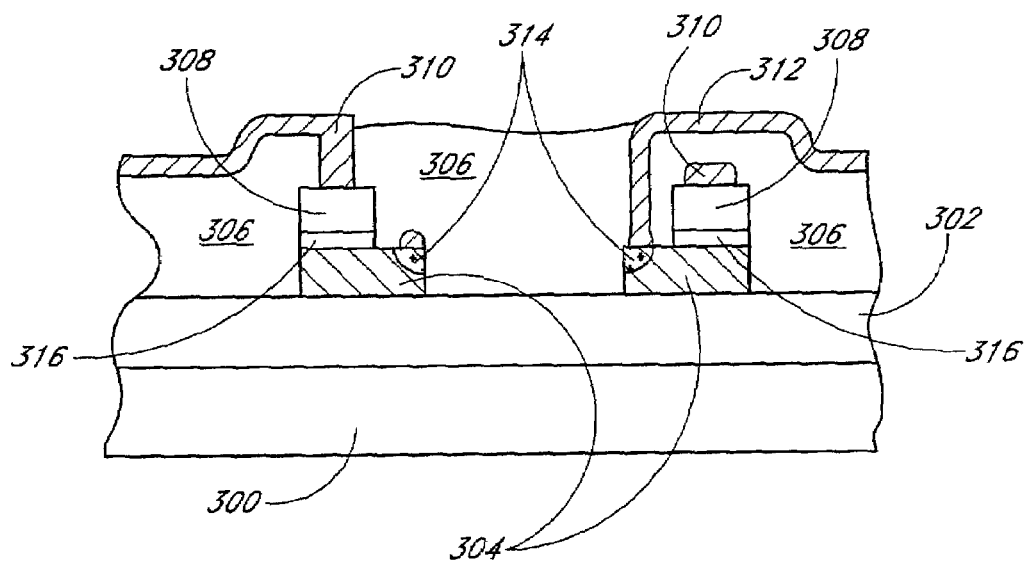
FIG. 5 is a cross-sectional view of a preferred embodiment of a resonant optical cavity formed with an annular-shaped semiconductor.
Figure 6:
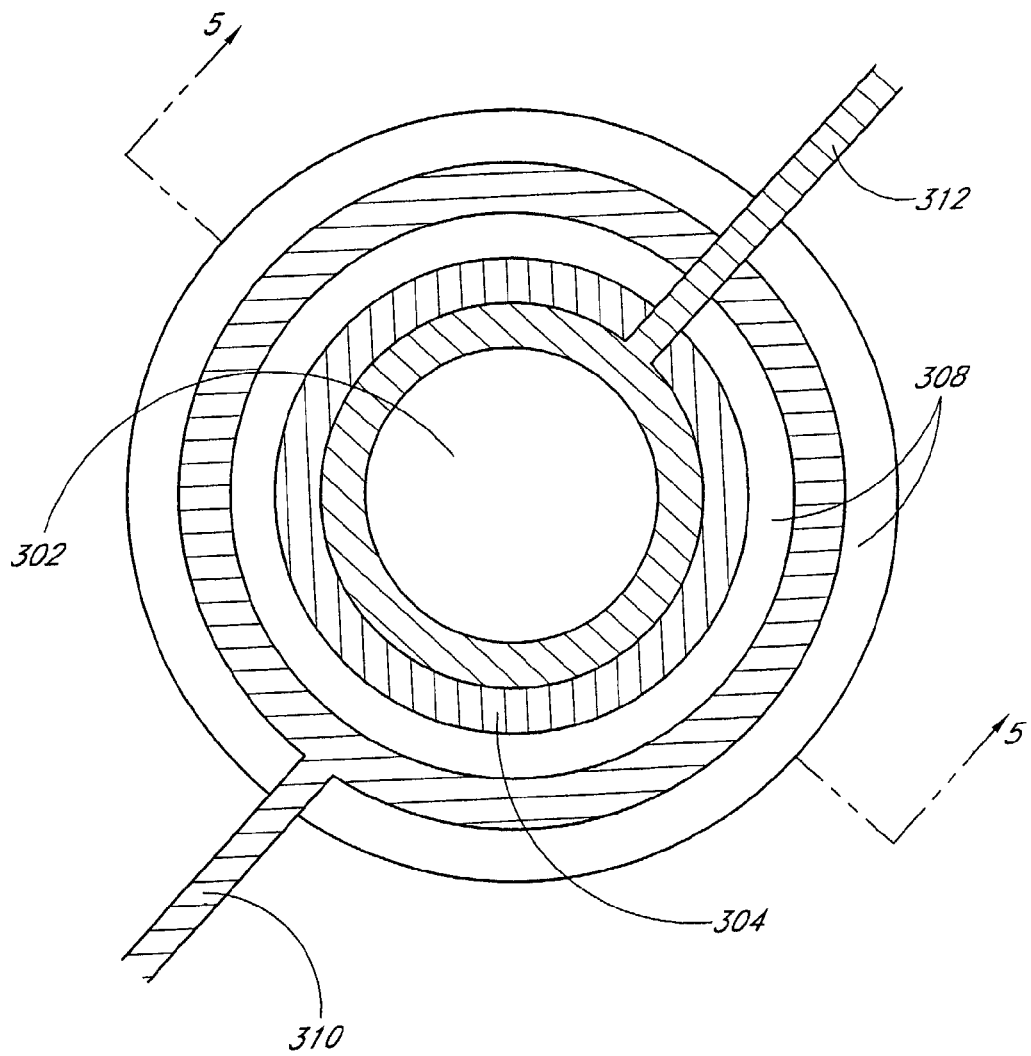
FIGS. 6 and 7 are a top and perspective views, respectively, of the resonant optical cavity of FIG. 5.
Figure 7:
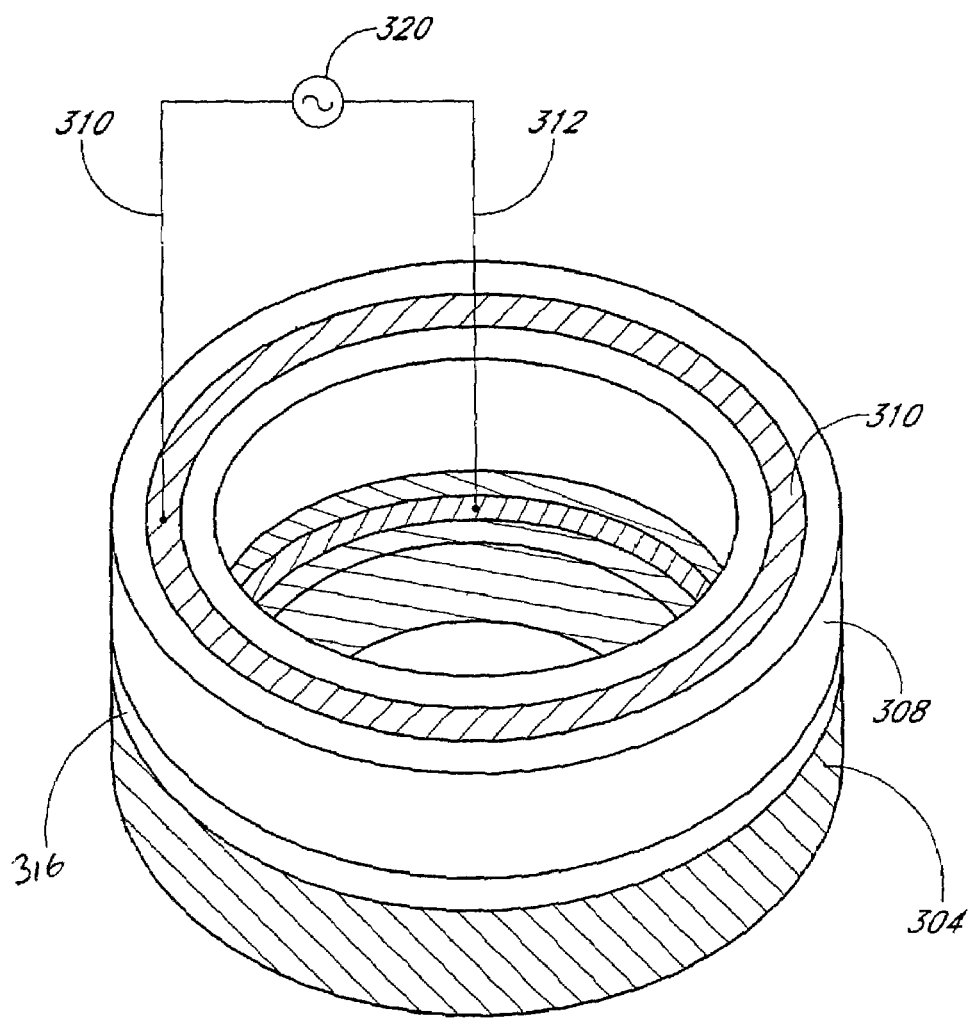

Another preferred embodiment for the resonant cavity 106 is shown in FIGS. 5 through 7. FIGS. 5–7 show the same views provided for the resonant cavity 106 illustrated in FIGS. 2–4, namely, cross-sectional, top, and perspective views. The cross-sectional view of FIG. 5 is across the line 5—5 shown in FIG. 6.

The resonant cavity 106 illustrated in FIGS. 5–7 has a slab 304 like the disk-shaped slab 204 in the resonant cavity shown in FIG. 2–4, however, this slab has a hole therein. Accordingly, the slab 304 is annular and may be characterized as a channel-like waveguide instead of a slab-like waveguide or as a hybrid of the two waveguide types. Nevertheless, this portion 304 of the structure 106 will be referred herein as a slab region with the understanding that it has a hole therein which may act to confine light within an annular region. The slab region 304 sits atop a cladding layer 302 formed on a substrate 300. The slab region 304 preferably has a higher index of refraction than the cladding layer 302. In various preferred embodiments, the slab region 302 comprises single crystal silicon (e.g., active silicon) and the cladding layer 302 comprises silicon dioxide (e.g., buried-oxide layer). Other semiconductors may be used provided they are sufficiently transparent in the wavelength range of interest.

As shown in FIG. 5, this embodiment further includes an insulating layer 306 at least partially covering the slab 304. This insulating layer 306 preferably has a refractive index lower than the refractive index of the slab 304, so as to serve as an upper cladding layer confining light within the slab. The insulating layer 306 preferably comprises silicon dioxide. As discussed above, the insulating layer 306 prevents unwanted flow of electrical isolated conducting pathway that form part of the structure 106. Those skilled in the art will recognize that other insulating materials such as polymers may be used in forming the insulating layer 306. This insulating layer 306 may comprise a plurality of sub-layers.

This structure preferably further includes an annular strip 308 comprising a relatively high refractive index material substantially aligned with the annular shaped slab 304. This material preferably has a relatively high refractive index in comparison to that of the insulating layer 306 covering the slab 304. The material comprising the annular strip 308 is also preferably substantially transparent and non-absorbing to the wavelength light for which the resonant cavity 106 is designed. Preferably, the strip material is partially conductive and may comprise doped semiconductor. In certain preferred embodiments, the annular strip 308 comprises doped polysilicon, which has a refractive index comparable to that of single crystal silicon. Alternatively, the annular strip 308 may comprise single crystal silicon. Those of skill in the art would recognize that other materials may be used for the strip 308. The materials preferably have a substantially high refractive index in comparison with the insulating material covering the slab 304. Although the strip 308 is shown as having an outer perimeter substantially aligned with that of the annular shaped slab 304, in other embodiments, the two need not be aligned. Furthermore, the slab 304 may extend well beyond the strip 308 especially in cases where the slab is not circular or annular but is a sheet or layer of material or unpatterned bulk substantially wider than the total spatial extent of the annular strip.

The strip 308 is separated from the slab 304 by a transition layer 316 of the insulating material to prevent the flow of current between the strip 308 and the 304 to thereby facilitate carrier accumulation and depletion. This insulating material preferably has a lower index of refraction than the slab 304 as well as the annular shaped strip 308. This transition layer 316 preferably has sufficiently thickness such that the carriers do not traverse this barrier either through defects (e.g., "pinhole" defects) or by tunneling. Conversely, the thickness of this dielectric layer 316 is preferably not so large as to require a large voltage to be applied to the device to generate or deplete the desired amount of carriers.

As shown in FIG. 5, the resonant cavity 106 further includes a first (strip) electrode 310 electrically coupled to the annular strip 308. As shown in FIGS. 6 and 7, the strip electrode 310 includes a portion that is annular in shape that is electrically connected to a voltage source 320. This embodiment further includes a second (slab) electrode 312 electrically coupled to the top surface of the slab 304. As discussed above, the slab 304 has a hole therein and is likewise annular with an inner and an outer diameter and respective concentric boundaries defined by inner and outer edges. Similarly, the annular strip 308 has an inner and an outer diameters and respective concentric boundaries defined by inner and outer edges. Preferably, the inner diameter of the annular strip 308 exceeds the inner diameter of the annular slab 304. The slab 304 extends radially inward beyond the inner edge of the annular strip 308 so as to expose an annular-shaped top surface of the slab 304 for connection with the slab electrode 312. This inner portion of the slab 304 preferably includes a doped region 314 in contact with the annular-shaped portion of the slab electrode 312 so as to create an ohmic contact between the resonant cavity 304 and the slab electrode 312.

As shown in FIG. 7, the slab electrode 312 is also electrically coupled to the voltage source 320, allowing for the application of a potential difference between the strip and slab electrodes 310, 312. This voltage source may be AC or DC. Alternate sources of power for creating an electric field between the strip 308 and the slab 304 are also possible. As shown in FIG. 5, the first and second electrodes 310, 312 are separated by the insulating layer 306 to prevent unwanted electrical contact between them. The insulating material 306 is not shown in FIGS. 6 and 7 in order to more clearly illustrate of the interior features of the structure. The strip and slab electrodes 310, 312 preferably comprise a metal, although one of skill in the art would recognize that other materials may be used such as for example, polysilicon or silicide.

As discussed above with respect to FIGS. 2–4, the structure shown in FIGS. 5–7 may be manufactured using conventional fabrication processes including but not limited to SOI and CMOS technology. Deposition and patterning techniques may include for example, sputtering, chemical vapor deposition, etching, and damascene processes, which are well known in the art of semiconductor device fabrication as well as fabrication methods yet to be developed.

In various other embodiments, the shape of the resonant cavity may be configured differently. For example, the annular slab 304 shown in FIGS. 5–7 may be narrower such that for example the inner diameters (as well as outer diameters) of the annular slab and annular strip 310 are substantially the same. In this exemplary case, the slab 304 does not extends radially beyond the edges of the annular strip 308 so as to expose an annular-shaped top surface of the slab 304. Electrical connection is made elsewhere to the slab 304. The narrower width of the slab 304 may act to confine the optical mode laterally. As discussed above, this annular guiding structures 304 may provide lateral confinement and for this reason is like a channel type waveguide in contrast with a slab waveguide, confining light both in vertical and horizontal directions, even without the presence of the annular strip 308. This configuration is referred herein as "ring-shaped."

In certain embodiments, the annular strip 208, 308 and slab 204, 304 may also be shaped differently so as to provide a closed optical path other than circular or annular. Other geometries for guiding light are also possible. In addition, the resonant optical cavity path may not be completely closed but may include interruptions, for example, where light can escape or be coupled into or out of the resonant cavity. In other embodiments, the optical path may not be closed at all, and may more closely resemble a Fabry-Perot resonant cavity with reflective surface on opposite ends, the light propagating back and forth rather than round and round a closed optical path. As discussed above, the resonant cavities can be formed using waveguides such as for example, strip loaded, channel, ridge or rib, and slab. These resonant cavity may also be formed from photonic crystal band gap waveguides or may comprise other types of guiding structures known in the art or yet to be developed.

Figure 8:
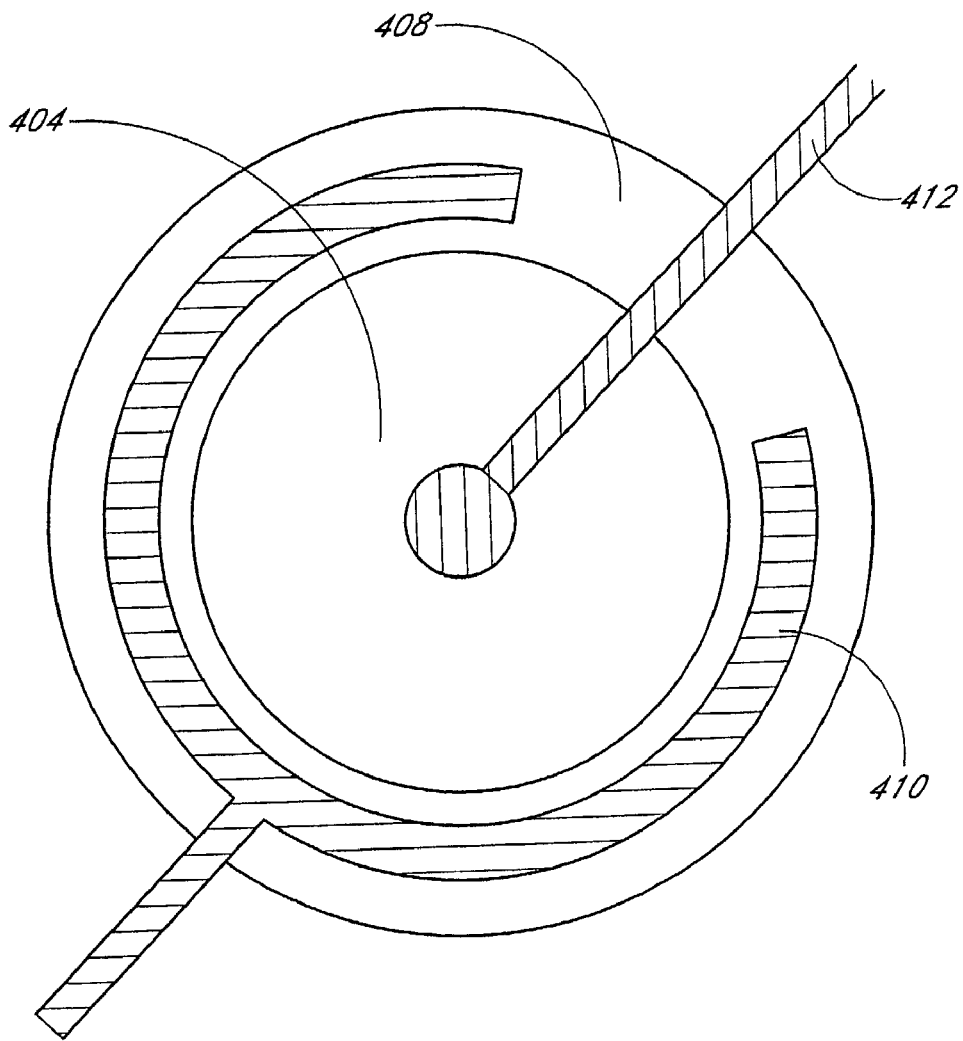
FIGS. 8 and 9 are top views showing different electrode configurations associated with preferred embodiments of a resonant optical cavity.

The electrode configuration may also be configured differently. The optical resonator shown in FIGS. 2–4 includes a first electrode 210 that forms an uninterrupted continuous ring above the perimeter region of disk-shaped slab 204 and annular strip 208. FIG. 8 shows a top view of another embodiment for an optical resonator 106 in which the first electrode 410 only forms a partial ring, extending around less than the entire circumference of the resonant cavity 404. Metal is absorbing and metallization and/or salicide in the proximity of the guiding region may induce attenuation of light therein. Accordingly, it is desirable to reduce the interaction between the metal electrodes and the optical field to avoid or reduce absorption of light by the metal. The configuration of the strip electrode 410 in FIG. 8 advantageously decreases the amount of light absorbed by this electrode. In the structure shown in FIG. 8, the resonant cavity 106 comprises a disk shaped slab 404 and an annular strip 408 similar to the slab 204 and strip 208 depicted in FIGS. 2–4. The strip 408 forms a circular closed path substantially following the perimeter region of the slab 404. In this case, the outer boundary of the slab 404, hidden in FIG. 8, is substantially aligned with the outer boundary of the strip 408 although alignment is not necessary. For example, the slab 404 may extend beyond the perimeter of the strip 408 especially in other embodiments where the slab comprises a sheet of material having large spatial extent in comparison with that of the strip 408. The first strip electrode 410 is electrically coupled to the strip 408 and the second slab electrode 412 is electrically coupled to the slab 404. Preferably, the strip electrode 410 is spaced from the slab 404 by the strip 408 in a similar fashion as the strip 408 shown in FIGS. 2–4. The slab electrode 412 is separated from the strip 408 by insulating material, e.g., oxide. The insulating material separating the strip 408 from the slab electrode 412, especially at the location where the electrode passes over the strip, is preferably sufficiently thick to reduce or avoid interaction between the slab electrode and the optical mode within the strip. Separation is also desirable to avoid shorting the slab electrode 410 on the conducting strip 408.

In FIG. 8, the slab electrode 412 corresponds to the slab electrode 212, 312 shown in FIGS. 2–4 and FIGS. 5–7, respectively, permitting the application of a controllable voltage between the first and second electrodes 410, 412. Various other features discussed above in connection with the previous embodiments, such as the presence of the doped region 214 in the slab 204, may be present in this structure from of FIG. 8 as well.

Figure 9:
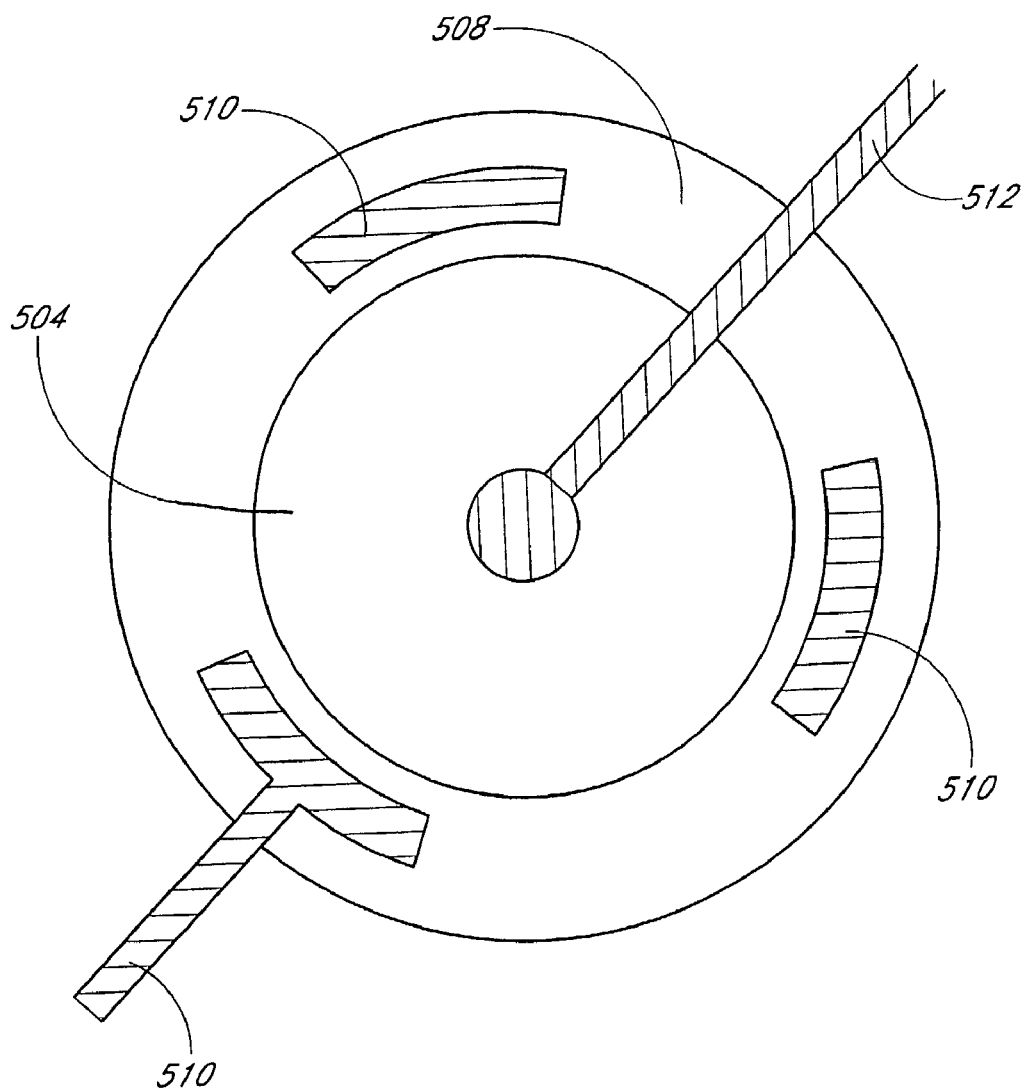

Other embodiments of the resonant cavity may include two or more electrode segments positioned above the perimeter region of the cavity. For example, FIG. 9 shows a top view of an embodiment of an optical resonator in which the first electrode 510 includes three spaced apart sections substantially extending along perimeter portions of the resonant cavity. In FIG. 9, the resonant cavity 106 comprises a disk shaped slab 504 and an annular strip 508 similar to the disk shaped slab 204 and annular strip 208 of FIGS. 2–4. The strip 508 forms circular closed path substantially following the perimeter region of the slab 504. (In this case, the outer boundary of the slab 504, hidden in FIG. 9, is substantially aligned with the outer boundary of the strip 508. ) The first strip electrode 510 is electrically coupled to the strip 508 and the second slab electrode 512 is electrically coupled to the slab 504. Preferably, the strip electrode 510 is spaced from the slab 504 by the strip 508 as are the corresponding strips 208, 308 shown in FIGS. 2–4 and 5–7. The slab electrode 512 is separated from the strip 508 by insulating material, e.g., oxide. The insulating material separating the strip 508 from the slab electrode 512, particularly at the location where the electrode passes over the strip, is preferably sufficiently thick to reduce or avoid interaction between the slab electrode and the optical mode within the strip. Separation is also desirable to avoid shorting the slab electrode 410 on the conducting strip 508. The strip electrode 510 includes connecting portions, omitted from FIG. 9 for clarity, that electrically connect the three illustrated portions. These connecting portions are spaced above the portions of strip electrode 510 shown in FIG. 9, and are separated from strip 508 by insulating material. The segmented strip electrode 510 permit electric fields to be applied to designated regions of the annular strip 508. Absorption resulting from interaction of a segmented metal/salicide strip electrode 510 and the optical field within the strip 508 are also reduced by decreasing the area of interaction between the strip electrode and the strip. Segmented electrodes are also compatible with conventional CMOS fabrication processes and designs which employ a plurality of vias down to, e.g., salicide layers.

The strip electrode 510 and the slab electrode 512 shown in FIG. 9, are connected to a supply (not shown) to permit the application of a voltage between the strip and the slab. Various other features discussed above in connection with the previous embodiments, such as the presence of the doped region 214 in the resonant slab 204, may also be present in this structure as well.

C. Operation of the Optical Resonant Cavity

The operation of the optical cavity 106 shown in FIGS. 2–4 will now be described. Under certain conditions, when the resonant cavity 106 of FIG. 2 is disposed sufficiently close to a waveguide propagating light, such as the first waveguide 100 of FIG. 1, light from the waveguide may couple into the disk-shaped slab 204 of the resonant cavity. Because the disk-shaped slab 204 has a substantially higher refractive index than the upper and lower cladding 206, 202 above and below, light can confined therein. Lateral confinement within the slab 204 is provided by the annular strip 208 which defines a substantially circular path around the perimeter region within the slab. Light coupled into the resonant cavity 106 propagates around this closed optical path partially within the slab and partially within the strip. The optical mode will likely be distributed within the strip, the region of the slab substantially below the strip and in proximity thereto, as well as within the transition region 216 therebetween.

Light traveling on a closed path within the resonant cavity 204 can interfere constructively or destructively with itself depending upon the length of the closed path, the wavelength of the light, and the effective index of refraction along that path. More particularly, the controlling relationship is between the wavelength and the optical path length (OPD) of the optical path in the resonant cavity, i.e., product of the physical length of the path and the effective index of refraction along that path. Light traveling on paths for which the total optical path length is an even number of half-wavelengths will experience constructive interference; light traveling on paths for which the total optical path length is an odd number of half-wavelengths will experience destructive interference. Because of this phenomenon, the resonant cavity 204 contains one or more standing waves at certain frequencies associated with different modes.

It is generally known that the $m^{th}$ resonant frequency, $v_m$, of a generic resonant cavity is given by $$v_m = \frac{mc}{n_{eff} l}$$

where m is the mode number (an integer), c is the speed of light in a vacuum, $n_{eff}$ is the effective index of refraction of the mode in the resonator, and l is the path length of a full round trip inside the cavity. This equation applies to optical resonant cavities in general.

For a resonant cavity having a circular optical path, the circumference of the cavity determines the resonant wavelength. For the resonator depicted in FIGS. 2–4, the optical power for the optical mode is concentrated in a narrow band around the perimeter portion of the slab 204 beneath the strip 208 and in proximity thereto. Significant optical power in this optical mode is also present within the annular strip 208, and within the portion of the insulating material 216 located between the strip 208 and the slab 204.

Modulation of the resonant frequency of the optical resonant cavity 106 may be achieved by changing the effective index of refraction of the material comprising the perimeter portion of the cavity 204. Changing the index changes the effective optical path length, $n_{eff} l$, thus changing the resonant frequency as dictated by the above equation.

The effective index of refraction of a mode is proportional to the real refractive index, $n_o$, such that:

$$n_{eff} = n_r n_o$$

where $n_r$ depends upon the geometry of the waveguide. The change in the resonant frequency, $\Delta v$, due to a change in the refractive index, $\Delta n$, is given by:

$$\Delta v = -\frac{v_m}{n_0} \Delta n.$$

This equation applies a broadly to optical resonant cavities in general.

As discussed above, the refractive index of a semiconductor, such as silicon, is dependent upon the existence of free carriers within the semiconductor, such that increasing the number of free carriers in a region generally lowers the refractive index of that region. Conversely, decreasing the number of free carriers in a region raises the refractive index of that region. Thus, by manipulating the number of free carriers in a region of a semiconductor like single crystal or polycrysalline silicon, the refractive index of that region may be controlled. Changing the refractive index changes the effective optical path length of the cavity, $n_{eff} l$, and, by extension, the resonant frequency, $v_m$. Accordingly, the resonant cavity can be tuned.

The density of free carriers in a region of the disk-shaped slab 204 beneath the strip 208, and within the strip as well, may be changed via the field effect by applying a potential difference between the strip and slab electrodes 210, 212. As used herein the term "field effect" corresponds to the effect exhibited in field effect transistors (FETs). Application of an electric field to a semiconductor junction causes a depletion of carriers near the junction. With continued application of the field, inversion may result wherein opposite type carriers are attracted to the junction and the depletion region. In this manner, the free carrier distribution in the semiconductor can be controlled and varied by applying an electric field to the semiconductor. This junction may be formed between the semiconductor and an adjacent insulator across which the electric field is applied.

In this case, applying a voltage between the strip and slab electrodes 210, 212 through the insulating transition region 216 creates an electric field that may cause electrons to be depleted at the top surface of the slab 204 beneath the annular strip 208, and more particularly, beneath the insulating transition layer 216. This depletion of electrons occurs in the case where the semiconductor is doped n-type and the a polarity is appropriate to force these electrons away from the junction. Applying additional voltage between the 208 strip and the slab electrodes 210, 212 may cause inversion wherein holes are attracted and accumulate at the portion of the slab 204 beneath the strip and the transition layer 216. The existence of the insulating transition layer 216 prevents the holes from flowing into to the strip 208.

The existence of the insulating transition layer 216 allows for the manipulation of the optical properties of the resonant cavity 204 using the field effect, a variation of which is utilized in field effect transistors (FET) technology, such as metal-oxide on semiconductor field effect transistors (MOSFET).

The field effect enables modulation and/or control of the free carriers and free carrier density underneath the strip 208, precisely where the optical mode is confined, thereby providing strong interaction between the carriers and the light. Increasing the magnitude of the applied voltage increases the depletion or accumulation of either electrons or holes, depending on the polarity and doping, and other conditions. Accordingly, the effective index of refraction can be changed. This ability to variably control the refractive index permits tuning of the resonant frequency of the cavity.

Because metals strongly absorb light, it is advantageous to keep the strip and slab electrodes 210, 212 at a distance from the optical path of the resonant cavity formed by strip 208 and slab 204. The strip 208, comprising doped semiconductor, provides electrical connection while separating the metal electrode 210 from a substantial portion of the optical energy in the mode. An electric field may therefore be applied to the desired light path while minimizing or reducing light absorption caused by strip electrode 210. Other transparent conductors can alternatively be inserted between the strip electrode 210 and the perimeter portion of the slab 204. To further protect against light absorption by metal, portions or all of the strip and slab electrodes 210, 212 may comprise conducting polysilicon, rather than metal. However, when adding high refractive material near the strip 208 and slab 204, however, care must be taken to ensure that the resonator remains single-mode. Lower refractive index conducting material may therefore be preferred.

Figure 10A:
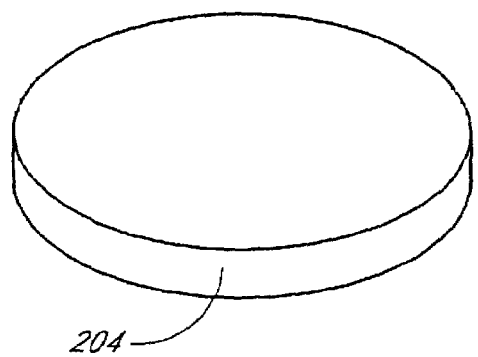
FIGS. 10A and 10B are perspective and cross-sectional views of a resonant optical cavity schematically illustrating confinement of light in the optical cavity.
Figure 10B:
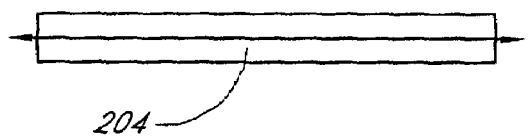
Figure 10C:
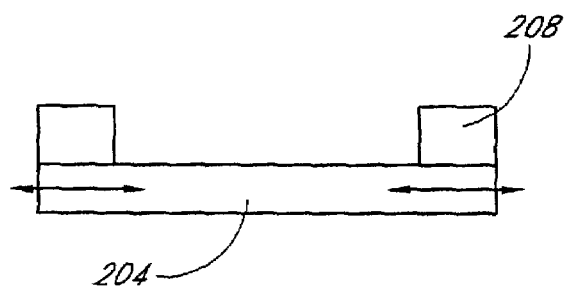
FIGS. 10C and 10D are cross-sectional views of the resonant optical cavity depicted in FIGS. 10A and 10B schematically illustrating optical confinement by introducing an annular shaped strip around the perimeter of the optical cavity and doping the center of the optical cavity.

As discussed above, the transparent strip 208 also serves to confine the light to an optical path along the perimeter of the slab and therefore defines the optical mode as is illustrated graphically in FIGS. 10A–10D. FIG. 10A portrays an perspective view of the disk-shaped slab 204 of FIGS. 2–4. FIG. 10B shows a cross-sectional view of slab 204. The arrow within slab 204 indicates that light may propagate throughout the interior of slab 204. This light corresponds to the optical power associated with a number of different modes. As discussed above, an evanescent field penetrates beyond the boundaries of the core region 204. FIG. 10C shows slab 204 together with the annular strip 208. The arrows in FIG. 10C illustrate the lateral spatial extent of the optical mode supported within the slab 204 with the addition of the strip 208 above the perimeter portions of the slab. As discussed above, light is confined to the portions underneath the strip 208. Confining the light to the perimeter region of the slab 204 may prevent multiple modes from propagating within the slab. The dimensions of the strip 208 and slab 204 as well as the respective indices of refraction and that of the surrounding cladding determine what modes are supported. Preferably, these parameters are selected to support single mode propagation within the resonant cavity 106.

Figure 10D:
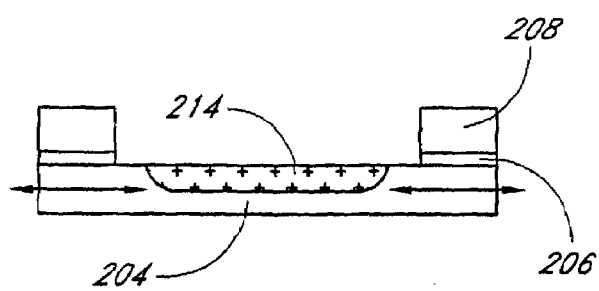

FIG. 10D depicts the insulating layer 206 between the annular-shaped strip 208 and the disk shaped slab 204. As shown, the strip 208 continues to provide confinement of the light in the periphery of the disk shaped slab 204 despite the presence of the insulating layer 206, if this layer is sufficiently thin.

As discuss above, the slab electrode 212 may be electrically contacted with the slab 204 via an ohmic contact between slab electrode and a central doped region 214 of slab. The doped region 214 of disk shaped slab 204 provides two additional advantages. As illustrated in FIG. 10D, this doped region 214 is preferably substantially located at the center of the circular shaped slab 204 and the dopant added to the doped region 214 preferably strongly absorbs light. Because this absorption is provided in the central portion of the resonant cavity 204, light from the perimeter portion of the slab 204 that propagates to the doped central region 214 is preferentially absorbed. The dopant added to the doped region 214 also preferably lowers the refractive index of the central region of the slab 204, thus enhancing confinement of light within the periphery of the slab. As a result of these two effects, the doped region 214, like the strip 208 discussed above, promotes confinement of light to the perimeter portion of the resonant cavity 204. These design features can be used to prevent the higher order modes from propagating within the slab such that substantially all the optical power can be concentrated into the one optical mode traveling around the perimeter of the resonant cavity 204.

The remainder of the slab 204 including regions beneath the strip 208 may also be doped p or n type so that the semiconductor slab is conducting. The dopant is at higher concentration at the center of the slab 204 to quench modes in that region. Depending upon the doping and other geometrical considerations, a positive or negative voltage may be applied between the strip and slab electrodes 210, 212 in order to modulate the refractive index of the optical path in the resonant cavity.

Figure 11:
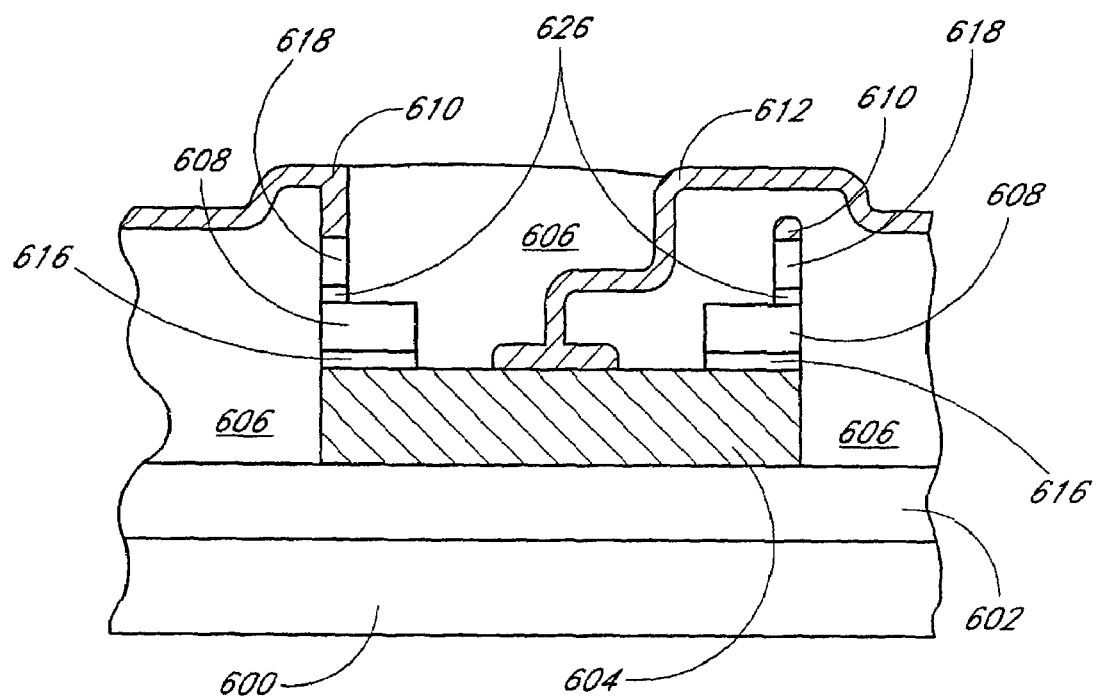
FIG. 11 is a cross-sectional view of another resonant optical cavity formed with a disk-shaped semiconductor configured to provide an alternative carrier distribution.

FIG. 11 shows another preferred resonant cavity 106 that allows for modulation of the free carriers in a resonant cavity through the field effect. This structure includes a substrate 600 analogous to the substrates 200, 300 of the earlier embodiments, on top of which is a lower cladding layer 602 like the layers 202, 302 in the embodiments described with reference to FIGS. 2–4 and FIGS. 5–7. This resonant cavity further comprises a disk-shaped slab 604, preferably comprising single crystal silicon. Although this slab 604 is disk shaped, as in FIGS. 2–4, it may have other shapes and may, for example, be annular, as in FIGS. 5–7. An annular strip 608 is disposed over the disk-shaped slab 604 along a perimeter region of the slab. First and second (strip and slab) electrodes 610, 612, analogous to the electrodes 210, 212, 310, 312 of the earlier embodiments, may be used to apply an electric field into the perimeter region of the slab 604. (A doped region, omitted from FIG. 11 for clarity, is preferably included to create an ohmic contact between the slab electrode 612 and the slab 604.) An insulating layer 606 covers the slab 604. This resonant cavity 106 further includes a first thin insulating transition layer 616 that separates the strip 604 from the slab 604 in a manner analogous to the transition regions 216, 316 discussed above.

The resonant cavity 106 shown in FIG. 11, however, includes a second thin insulating layer 626 on the strip layer 608. A gate 618 is formed over the second thin insulating layer 626. This gate 618 may be annular in shape to match the annular strip 604 layer below. This gate layer 618, however, preferably has a width smaller than that of the strip layer 604, that is, the difference between the outer and inner diameter of the annular strip is greater than the difference between the outer and inner diameters of the annular gate layer. The first (gate) electrode 610 is connected to the gate 618. The second (slab) electrode 612 is connected to the slab 604. The strip 608 preferably comprised of polysilicon and may alternatively be comprised of crystalline silicon. Other materials that are preferably conductive and have a high refractive index in comparison to the surrounding insulating layer 606 may also be used. The gate 618 also may be comprised of polysilicon or single crystal silicon. Other preferably conductive materials may be employed as well. Materials having a lower refractive index than that of the strip 608 will be less likely to alter the shape of the optical mode in the strip and slab 604.

The strip 608 serves to confine light laterally within the slab 604 in a region below the strip and in proximity thereto. Thus, optical power is distributed in this region in the slab 604 as well as within the strip 608 and the thin insulating region 616 therebetween as described above. This embodiment provides the advantage that the field effect created by applying a voltage between the first and second (gate and slab) electrodes 610, 612 will may influence not only the free carrier distribution in the slab 604, also the free carrier distribution in the strip 608. In the "whispering gallery" mode, there is significant optical power both in the perimeter region of the slab 604 and in the annular strip 608. This design allows for the variable control of the refractive index in both of these locations. The free carrier density beneath the first thin insulating transition layer 616 between the strip 608 and the slab 608 can be controlled as described above. In addition, with the configuration shown in FIG. 11, the concentration of free carriers beneath the second thin insulating transition layer 626 and in the strip 608 can be selectively altered.

The electron concentration can be controlled in the strip 608 substantially independently, by electroding the gate 618 and the strip 618 instead of the gate and the slab 608. A stronger affect on the electron density below the gate 618 may be achieved in this manner. In this specific configuration the voltage is across the gate 618 and the strip 608 and not across the strip and the slab 604. Other configurations can be employed to yield different results. For example, two voltage sources can be utilized to provide independent variable control of the carriers within the slab 604 and those within the strip 608. One voltage source can establish a field across the first thin insulating transition layer 616 and another supply can induce a field through the second thin insulating transition layer 626.

As shown in FIG. 11, the width of the gate layer 618 is preferably smaller than the width of the strip 608. This reduced width is intended to reduce perturbation of the shape of the resonator mode due to the gate 618, which may comprise silicon, and have a substantially similar refractive index as the strip 608, which may also comprise silicon. As discussed above, however, the strip 608 need not be aligned with the outer edge of the disk shaped slab 604 and the slab may extend well beyond the strip. Moreover, the slab 604 need not be disk-shaped an may comprise a wide planar sheet or layer of semiconductor material. In addition, the gate 618 need not be aligned with the outer edge of the annular strip 608.

The resonant optical cavity 106 shown in FIGS. 5–7 operates similarly to the optical cavity of FIGS. 2–4. Light traveling on a closed path within the annular resonant cavity 106 can interfere constructively or destructively depending upon the relationship between the optical path length of the closed path and the wavelength of the light. Light traveling on paths for which the total optical path length is an even number of half-wavelengths will experience constructive interference; light traveling on paths for which the total path length is an odd number of half-wavelengths will experience destructive interference. Because of this phenomenon, the structure forms a resonant cavity 106 that resonates at certain frequencies.

Variable control of the resonant frequency of the optical resonant cavity 106 may be achieved by changing the effective index of refraction of the material in the annular guiding region. The density of free carriers in a region of the resonant cavity may be changed via the field effect by applying a potential difference between the strip and slab electrodes 310, 312. Applying the appropriate voltage between the electrodes 310, 312 creates an electric field causing either electrons or holes to depleted or accumulated at the top surface of the slab 304 beneath the annular strip 308. These electrons or holes cannot freely flow between the strip 308 and the slab 304 because of the existence of the insulating layer 316 between slab 304 and the strip 308. In this manner the resonant frequency of the cavity can be tuned.

As discussed above, the resonant cavity 106 preferably supports a single optical mode, such as the "whispering gallery" mode. This objective may be accomplished by having the width of the guiding region sufficiently narrow that only one optical mode is guided. In one preferred design, the outer edge of the slab 304 can be used to provide confinement. In addition, the slab 304, in this case annular shaped, may be sufficiently narrow, i.e., the distance between the outer diameter and the inner diameter is sufficiently small, to prevent other modes from existing. Strong confinement can also be a provided by the sufficiently narrow annular shaped strip 308 disposed above the slab 304.

As discussed above, to facilitate application of an electric field within the slab 304, the slab electrode 312 is electrically connected to the surface of the slab. Preferably, an ohmic contact is formed by appropriately doping the contact region of the slab 304. This high concentration of dopant which may, for example, be concentrated toward the inner portion of the annular slab 304, may also assist in confining the optical mode to a localized region on the outer portion of the slab 304. The dopant may reduce the refractive index in the highly doped region thereby enhancing confinement or may absorb optical energy outside the guiding region.

The dimension of the slab 304 and strip 308 in large part along with the material the associated refractive index, define what modes are supported by the waveguide structure. These dimensions depend paritally on the wavelength of light for which the resonant cavity 106 is designed to operate. Various embodiments may be designed for light having a wavelength between about 1.3 and 1.6 micrometers. However, these structures are not to be limited to any particular wavelength or wavelength range and may be designed for microwave, infrared, visible, and ultraviolet wavelengths.

The thickness of the insulating transition layer disposed between the strip 208, 308, and the slab 204, 304 depends on the materials and on the voltage to be applied to effectuate the desired index change. The waveguide structures may be appropriately configured to suit the specific voltage range and index change.

As discussed above, these structures may be fabricated from semiconductor material such as single crystal silicon and polysilicon as well as dielectrics such as silicion dioxide. Other materials may also be employed. Moreover, other semiconductor and dielectrics may also be employed. In addition, various metals may be employed to form conductive pathways although non-metal conductors are also suitable and may be preferred in certain circumstances.

In addition, although the optical path is toward the outermost regions of the slab 204, the optical path need not be limited to this location on the slab. In other embodiments, for example, the slab may be larger and may not even be circular. A closed optical path, circular or non-circular, may be provided by, for example, strip loading or by ridges or ribs positioned elsewhere than on the outermost edges of the slab. However, more compact designs might be those depicted in FIGS. 2–7.

As discussed above, the waveguide structures are not limited to any particular type, such as a strip loaded waveguide having a relatively low index transition layer. Rib or ridge, slab, channel, and conventional strip loaded waveguide designs may be employed. For example, tunable resonant cavity can be formed from a ridge waveguide structure comprising semiconductor. A thin insulating layer can be formed over the ridge and metallization can be deposited on the thin insulator to form an electrode. The semiconductor can also be electroded and a voltage applied between the preferably doped semiconductor ridge and the metallization atop the thin insulating layer. The electric field through the thin insulating layer will induce the accumulation or depletion of free carriers in the semiconductor ridge altering its refractive index. In this manner, the index of refraction of a ridge waveguide can be manipulated.

Similar designs can be implemented for slab, channel, and strip waveguides comprising semiconductor. Namely, a thin insulating layer can be formed over these waveguides and metallization can be deposited on the thin insulator to create an electrode. Applying a voltage to the metallization and preferably the doped semiconductor may cause electrons or holes to be depleted or accumulated in the semiconductor altering the refractive index therein.

In these designs, the metallization within close proximity to the semiconductor waveguide may interact with the optical mode absorbing optical energy and introducing attenuation. Crystal or polycrystalline silicon can be substituted as an electrode material, however, the index of this material may be sufficiently high and may perturb the optical mode, depending on the particular design. The shape of electrode may therefore be specifically shaped to yield the desired result.

Other configurations are considered possible and may be more suitable for specific applications. For example, photonic bandgap crystal waveguides may be used, however, the dependency of the index of refraction on carrier density may depend on a number of factors. Nevertheless, the usable waveguide structures are not to be limited to those described herein and may include types yet to be discovered or developed.

D. Operation of the Optical Switching Apparatus

The operation of an optical switching apparatus 104 incorporating the resonant optical cavity 106 of FIGS. 2–4 will now be described. Associated with the optical switching apparatus 104 is an optical source, preferably a laser. This light source is preferably a continuous wave (CW) source, although the operation of the switching apparatus 104 is not so limited. The light output has a characteristic wavelength and optical frequency determined by the optical source. The resonant optical cavity 106 is designed to resonate at a frequency either at, or offset from, the optical frequency of the light source.

The resonant cavity 106 may comprise resonators such as those described or may comprise another type of resonant cavity. The following discussion will assume for illustrative purposes that the resonant cavity 106 comprises the configuration of FIGS. 2–4. It should be is understood, however, that the discussion applies to other resonant cavities as well.

As described above, the resonant frequency of the optical resonant cavity is determined by the length of the optical path around the circular guiding region of the slab 204 and the effective refractive index in this optical path. The dimensions and material of the resonant cavity 106 should be selected to create a resonant frequency close to the optical frequency of the light source. Due to manufacturing tolerances, however, the resonant frequency of a particular resonant cavity is difficult to produce with sufficient precision. As such, after manufacturing, the resonant frequency of a particular optical resonant cavity may be adjusted, for example, through thermal tuning.

Thermal tuning refers to the manipulation of the resonant frequency of the cavity through control of the temperature of the cavity material. This tuning may be accomplished by thermally coupling a temperature control unit to the resonant cavity 106 that allows the temperature of a portion, or all, of the resonant cavity 106 to be adjusted. A Peltier heating/cooling system, for example, may be in thermal contact with the resonant cavity 106. Resistive or other heating or cooling mechanisms may be employed as well to control the temperature of the waveguide structure.

Raising the temperature of the resonant cavity 106 alters the resonant frequency of the resonant cavity in two ways. First, thermal expansion of the disk-shaped slab 204 increases its diameter and the path length around the perimeter. The resonant frequency of a particular mode of the cavity can thereby be decreased. Second, the increase in temperature increases the number of free carriers in the resonant cavity 106, decreasing the refractive index of the resonant cavity, and thus increasing the resonant frequency. Because the latter effect is much stronger than the former, increasing the temperature of the resonant cavity 106 increases the resonant frequency. Once an optical resonant cavity has been manufactured and tested, its temperature may be raised (via heating) or lowered (via cooling), as needed, to tune the resonant frequency to the optimal frequency for a particular application.

Controlling the temperature of the resonant cavity can be employed instead of or in addition to applying an electric field to alter the free carrier density in waveguide structures and adjust or modulate the index of refraction. Thermal tuning, however, may not be as fast as tuning by using the field effect. In certain embodiments, thermal tuning will be used to adjust the operating point of for the resonant frequency of a resonant cavity and the field effect will be employed to rapidly modulate the tuning.

In operation, an optical input from the optical source is propagated down the first waveguide 100 shown in FIG. 1.

Because the refractive index of the first waveguide 100 is much larger than the refractive index of the cladding region 108, the waveguide 100 propagates light in a guided fashion, as discussed previously.

When it is desired that the input signal remain in the first waveguide 100 (i.e., to produce an output signal from the first waveguide 100 ), the optical resonant cavity 106 within the optical switching apparatus 104 is set to a state where the resonant frequency is offset from the optical frequency of the light source. Light of this optical frequency traveling on a closed path within the annular resonant cavity 106 interferes destructively therein. Accordingly, resonance is not achieved at this wavelength and light is not output from the resonant cavity 106, which as a result blocks coupling between the first and second waveguides 100, 102. In such a state, the light from the light source continues propagating down the first waveguide 100 without transferring any substantial amount of optical energy into the second waveguide 102.

Conversely, when it is desired that the input light switch to the second waveguide 102 (i.e., produce an output signal from the second waveguide 102), the optical resonant cavity 106 within the optical switching apparatus 104 is set to a state where the resonant frequency substantially matches the optical frequency of the light source. As discussed above, this frequency shifting may be accomplished electronically by modifying the voltage between the first and second electrodes 210, 212, shown in FIGS. 2–4. The thermal state, i.e., the temperature, of the resonant cavity 106 can also be changed so as to alter the free carrier concentration within the guiding region of the resonant.

The strength of the coupling between the first waveguide 100 and the optical resonant cavity 106 will depend upon the spacing A between the waveguide and the resonator as well as the dimensions and materials of the first waveguide 100 and the resonant cavity. Light from the light source traveling on the closed path within the annular resonant cavity 106 interferes constructively therein. Accordingly, resonance is achieved. The cavity is filled with a high intensity electromagnetic field. Some of this electromagnetic energy is transferred from the resonant cavity 106 into the second waveguide 102 and is output therefrom. Accordingly, when the optical resonant cavity 106 is tuned to the optical frequency of the light source, the light propagating in the first waveguide 100 can be strongly coupled or "dropped" into the second waveguide 102. The proportion of optical energy within the first waveguide 100 that is transferred to the second waveguide 102 depends on a number of factors such as the coupling efficiencies between the first waveguide and the resonant cavity 106, and between the resonant cavity and the second waveguide, as well as the absorption and scattering losses within the optical resonator.

Preferably, the relationship of the first waveguide 100 with respect to that of the optical resonant cavity 106 is designed so that the all of the optical energy from the first waveguide 100 is transmitted into the resonant cavity 106 when on resonance. Under this condition, known as "critical coupling," light coupled back from the resonator into the first waveguide 100 destructively interferes with the remaining light present in the first waveguide 100. As such, no energy is output from the first waveguide 100. Instead, the optical power is filly transmitted into the resonant cavity 106, where it is lost through two sources: 1) scattering/absorption in the resonant cavity 204; and 2) coupling of light into the second waveguide 102.

The power coupled into the second waveguide 102 will necessarily be lower than the power introduced in the first waveguide 100, due to the scattering/absorption within the resonant cavity. However, the magnitude of the electromagnetic field strength in the second waveguide 102 (i.e., the output signal) will be roughly proportional to the electromagnetic field strength in the first waveguide 100 (i.e., the input signal), with the proportionality constant determined by the sizes of the losses in the cavity.

There are different ways in which the system may be configured to transmit the optical power to either the first waveguide 100 or second waveguide 102. For example, the system may be designed so that applying the modulation voltage increases the frequency of the resonant cavity 106 to the optical frequency from a lower starting frequency. Conversely, the system may be designed so that applying the modulation voltage decreases the frequency of the resonant cavity 106 to the optical frequency from a higher starting frequency. In another embodiment, the resonant frequency may match the optical frequency when there is no applied electric field in the cavity.

As discussed above, the introduction or depletion of free carriers in a region has an effect on the absorption of light propagating through that region. As the free carrier density in guiding region of the resonant cavity 106 changes, the degree to which light is absorbed while passing through this region also changes. As such, when the carrier density along the optical path in the resonator is free of carriers, or depleted, the absorption of light will be less than when free carriers have been accumulated. Conversely, when free carriers are injected along the optical path in the resonator, the absorption of light in the resonator is increased. This relationship holds true for most waveguide structures. Photonic crystal band gap waveguides may vary differently.

As is well known, resonant systems may be characterized by a dimensionless "quality factor" commonly referred as Q, where:

$$Q = \frac{f_0}{\Delta f}$$

where $f_0$ is the resonant frequency of the resonator and $\Delta f$ is the full-width at half-maximum of the power spectrum of the resonator system. The Q of a resonant cavity determines the field strength within the cavity. There is an inverse relationship between absorption in the resonant system and Q. As such, generally when the carrier density along the optical path in the resonator is free of carriers, or depleted, Q is increased. On the other hand, when free carriers are injected along the optical path in the resonator, Q is decreased.

Figure 12:
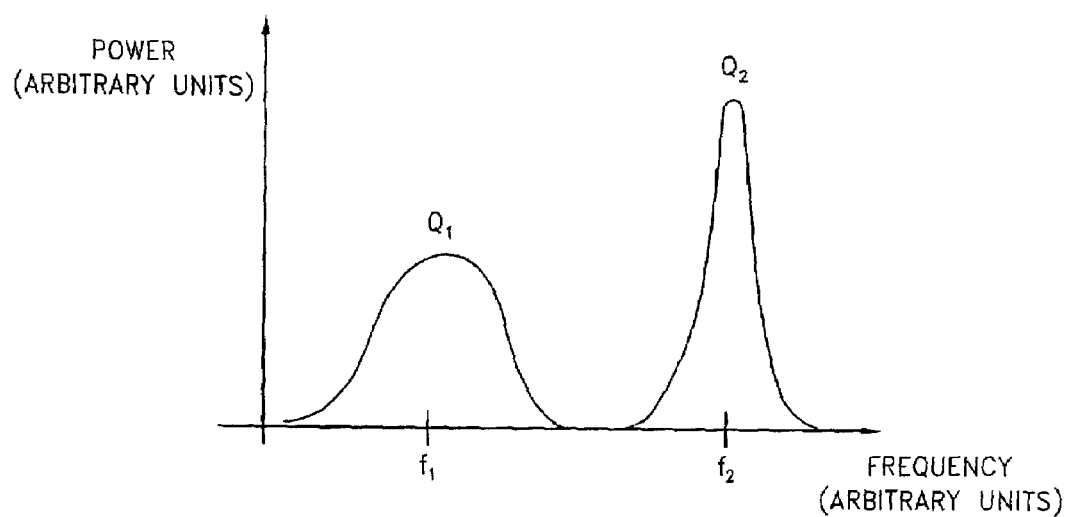
FIG. 12 is a plot on axis of frequency (in arbitrary units) and optical power (in arbitrary units) depicting the quality factor associated with different states of a resonant optical cavity.

The relationship between free carrier density and Q allows the coefficient Q to be tuned simultaneously with the tuning of the resonant frequency. FIG. 12 is a plot of power spectra for a resonator in two different states. In the first state, the resonator is tuned to resonant frequency, $f_1$, by accumulating carriers. This accumulation of carriers also results in absorption and a lower quality factor, $Q_1$. In the second state, the resonator is tuned to a higher another resonant frequency, $f_2$, by depleting carriers. With less carriers and less absorption, the quality factor, $Q_2$ is lower. By selecting the size and composition of the resonant cavity, together with any thermal tuning, a particular Q value can be achieved at a desired frequency. For example, two resonant cavities of different dimensions can be designed to having identical resonant frequencies and different Q values because one of them is thermally tuned to include more free carriers. This flexibility is advantageous when the cavity is to be used as a filter where control of Q is desirable. As discussed above, tuning can be alternatively achieved by applying an electric field to accumulate or deplete carriers as well. Thermal and electrical tuning can be utilized together as well.

When operated as an optical switch, it is advantageous that the density of free carriers be reduced within the resonant cavity 106 when the optical switch is coupling light from the first waveguide 100 to the second waveguide 102. With lower amounts of free carriers, losses due to absorption can be reduced. Furthermore, it is advantageous that the density of free carriers be increased within the resonant cavity 106 when the optical switch is not coupling light from the first waveguide 100. In this latter case, it is desirable that the light continue propagating along the first waveguide 100, with no power provided to the second waveguide 102, i.e., with reduced or negligible cross-talk between the two waveguides. By increasing absorption, losses in the resonant cavity 106 can be enhanced, and reflections from the resonant cavity back to the first waveguide 102 can be curtailed.

These conditions are accomplished by a configuration that decreases the number of carriers in the resonant cavity 106 when tuning the resonant frequency of the cavity to match the optical frequency of the input signal. For example, the system may be thermally tuned to have a resonant frequency matching the optical frequency in the absence of an applied voltage between the first and second electrodes 210, 212. Under these conditions, light will be dropped down from the first waveguide 100 to the second waveguide 102 through the resonant cavity 106 when there is no applied voltage from the voltage source 114. Applying a voltage then shifts the resonant frequency of the cavity away from the optical frequency, removing the coupling between the first waveguide 100 and the resonant cavity 106, thus switching the output signal to the first waveguide. Advantageously, carrier concentration and the consequent absorption is less in the state where energy is dropped from the first waveguide to the second waveguide, than when the resonator is detuned with the application of the voltage.

Figure 13:
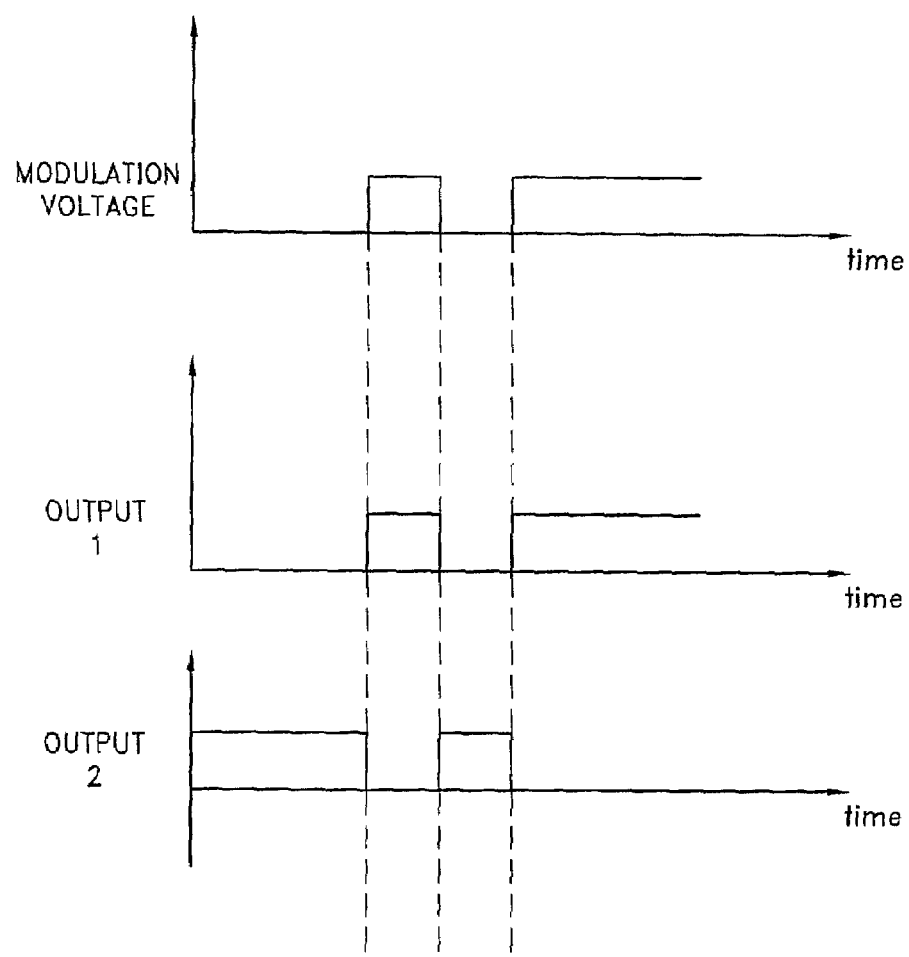
FIG. 13 shows plots illustrating the output variation over time in first and second waveguides responsive to a modulation voltage applied to an optical switching apparatus such as depicted in FIG. 1.

The relationship between the output signal on the first waveguide 100 ("Output 1") and on the second waveguide 102 ("Output 2") 112 for such a system is shown in FIG. 13. The modulation of the voltage applied between first and second electrodes 110 is shown at the top. A voltage of zero (i.e., no applied field effect in the resonant cavity 204), results in a HIGH output in the second waveguide 102 and a LOW output in the first waveguide 100. Conversely, when a modulation voltage is applied (inducing the field effect in the resonant cavity 204), the output in the second waveguide 102 drops to LOW, and the output in the first waveguide 100 changes to HIGH.

Alternatively, the system may be designed to create a mismatch between the resonant frequency of the cavity and the carrier frequency of the optical source in the absence of an applied voltage. For such a system, application of the voltage shifts the cavity resonant frequency to match the carrier frequency, causing the output signal to drop to the second waveguide 102. For this system, the outputs on the two waveguides would be reversed from what is portrayed in FIG. 13.

E. Modulating the Coupling Coefficient Between Optical Structures

In some applications, it is advantageous to modulate the coupling between two optical waveguide structures. The coupling may, for example, be controlled so as to preferentially allow, or preclude, propagation of light from one optical waveguide structure to the other. If the optical structures are comprised of semiconductor, such as silicon, modulation of the free carriers in one or both of the semiconductor waveguides may be used to manipulate the refractive index, thus altering the confinement of optical modes therein and the coupling between the structures.

Figure 14A:
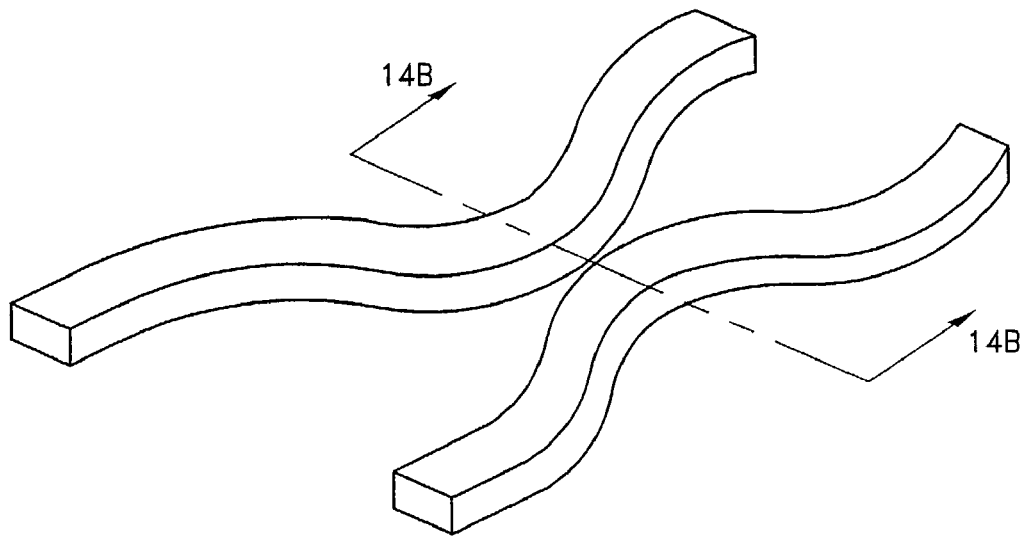
FIG. 14A is a perspective view of a directional coupler comprising a pair of spatially separated waveguides brought within close proximity along a coupling region.
Figure 14B:
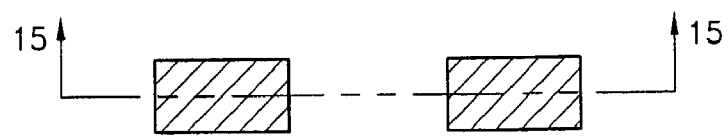
FIG. 14B shows a cross-sectional view through the line 14B—14B through the coupling region of the directional coupler of FIG. 14A.

FIG. 14A shows a pair of waveguides arranged to form a directional coupler. The waveguides include a core and cladding regions. The core is surrounded by the cladding material, not shown in FIG. 14, and as such, these waveguides may be considered channel waveguides although the waveguides should not be limited to any particular type. The core preferably has an index of refraction higher than that of the cladding. The core preferably comprises semiconductor such as for example single crystal silicon. The core may alternatively comprise polycrystalline as well as other semiconductors which are preferably substantially transparent at the wavelength region of interest. In various embodiments these semiconductors are preferably doped. The surrounding cladding material preferably comprises a dielectric such as silicon dioxide, although other relatively low refractive index insulators, such as air, may be used. The cladding in some cases may provide electrical insulation between the two waveguide structures. FIG. 14B shows a cross-sectional view of a coupling region within of directional coupler shown in FIG. 14A taken through the line 14B—14B.

Figure 15A:
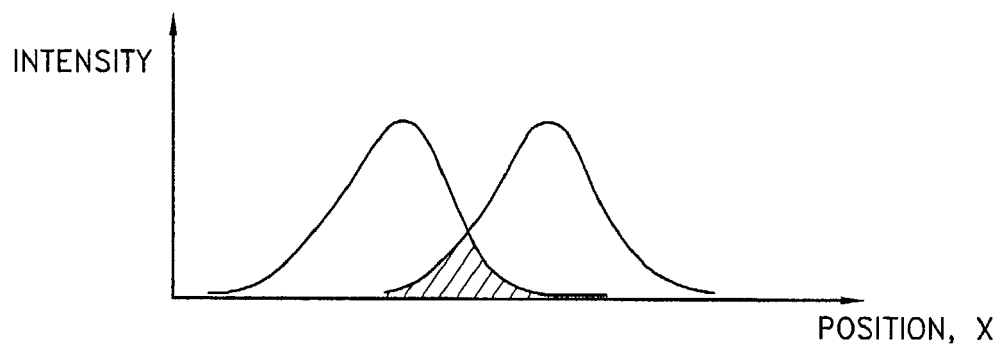
FIGS. 15A–15C are plots of light intensity as a function of location along the line 15—15 in FIG. 14B illustrating the extent of coupling for three different optical states.
Figure 15B:
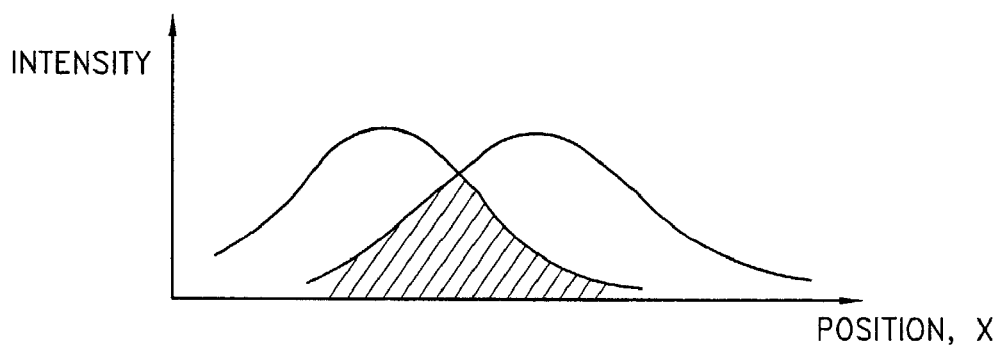
Figure 15C:
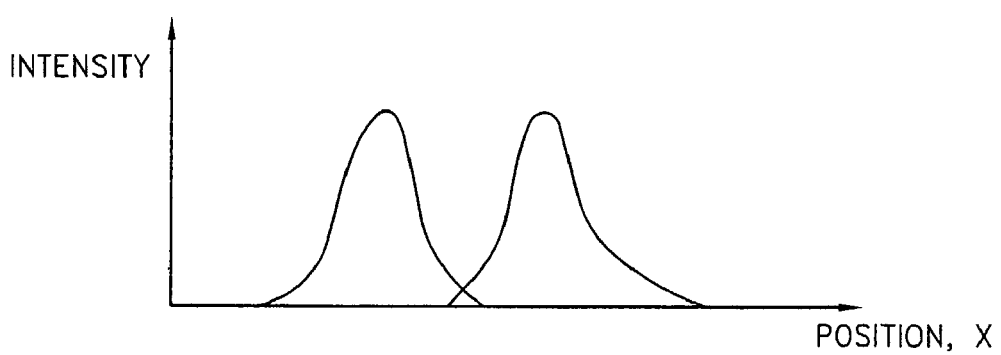

Depending upon the relative refractive index of the core and cladding, the evanescent field associated with light propagating through the waveguides will extend beyond the core different amounts. With less confinement, the evanescent field will continue farther outside the core. Since the waveguides are within close proximity to each other, the spatial modes begin to overlap facilitating the transfer of optical energy therebetween. This effect is illustrated graphically in FIGS. 15A–15C, which shows three plots of intensity versus distance along the line 15—15 shown in FIG. 14B. FIG. 15A shows the intensity for light propagating through each waveguide when the refractive index of the core region of each waveguide has a particular value, $n_1$. FIG. 15B shows the intensity when the refractive index the core region of each waveguide is lowered, i.e., $n_2 < n_1$. As shown in the figure, the lateral spatial extent of the evanescent field extends out further from the within the waveguide, increasing the overlap between the two fields. FIG. 15C shows the intensity when the refractive index of the core region each waveguide is raised such that $n_3 > n_1$. In this case, the lateral extent of the evanescent fields shrinks, decreasing the overlap between the two fields.

The overlap between the two fields may be quantified by calculating an "overlap integral" that provides a measure of the strength of the coupling between the two waveguides which depends on the shape of the optical modes therein. The overlap integral may be used to determine a "coupling coefficient," wherein the stronger the coupling between the structures, the higher the associated coupling coefficient. Inspection of FIGS. 15A–15C reveals that the waveguides associated with FIG. 15B have a larger coupling coefficient than the waveguides associated with FIG. 15C.

As discussed previously, the refractive index of a semiconductor, such as silicon, may be varied by altering the distribution of free carriers. Likewise, the coupling coefficient associated with a pair of closely spaced optical waveguide structures comprised of semiconductor may be manipulated by altering the distribution of free carriers in one or both of the structures.

Figure 16:
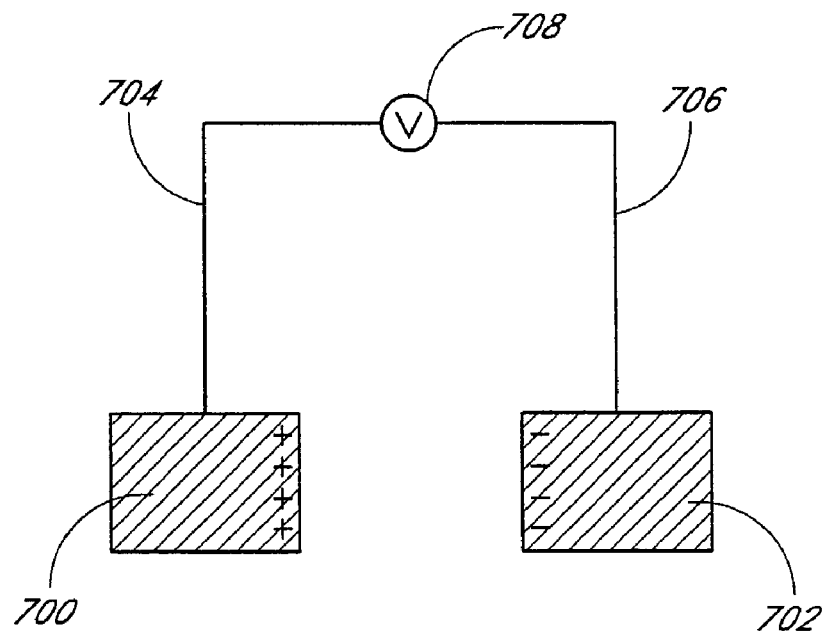
FIGS. 16–19 are cross-sectional views of waveguides pairs comprising a directional coupler such as shown in FIG. 14A each configured differently to selectively alter the optical states for varied levels of optical coupling.

FIG. 16 depicts a configuration for modulating the coupling coefficient associated with the directional coupler of FIG. 14. As shown in FIG. 16, the first waveguide 700 and the second waveguide 702 may be electrically connected to a voltage source 708 via a first electrode 704 and second electrode 706, respectively.

Applying a voltage between the first and second electrodes 704, 706 results in the capacitive storage of free carriers within the core region of each waveguide 700, 702. The capacitance between the two waveguides permits storage of opposite charge on each waveguide, which can be employed to alter the refractive index of the waveguides. The applied voltage may for example induce free carriers of opposite sign in each waveguide 700, 702. These carriers may be concentrated in the core adjacent the cladding between the two waveguides 700, 702 but this charge preferably extends through portions of the core where the optical mode is distributed. The insulating cladding material prevents the carriers from freely flowing between the two waveguides 700, 702. Application of the voltage creates an electric field, which may induce electrons to accumulate in the first waveguide 700, and holes to accumulate in the second waveguide 702, and vice versa, depending, for example on the doping. Thus, the voltage may be employed to increase or decrease the effective refractive indexes of either of the waveguides 700, 702. The particular affect of the applied voltage depends on the doping. For example, if the first and second waveguides 700, 702 are n and p doped, respectively, an applied voltage may be used to increase the refractive index of both waveguides. Confinement is strengthened, shrinking the associated evanescent fields and thereby decreasing the coupling coefficient. With a sufficiently large voltage, coupling within the waveguides can be reduced to a substantially zero. Changing the sign of the applied voltage in this scenario decreases the refractive index of both waveguides. The confinement is weakened, broadening the range of the associated evanescent fields and thereby increasing the coupling coefficient such that the waveguides are more strongly coupled.

If the coupling regions of the waveguides 700, 702 are each n-type or p-type, applying a similar voltage to each will affect each waveguide differently: raising the refractive index in one waveguide while lowering the refractive index in the other waveguide. With this electrical configuration, however, the refractive index in each waveguide is modulated substantially simultaneously.

Figure 17:
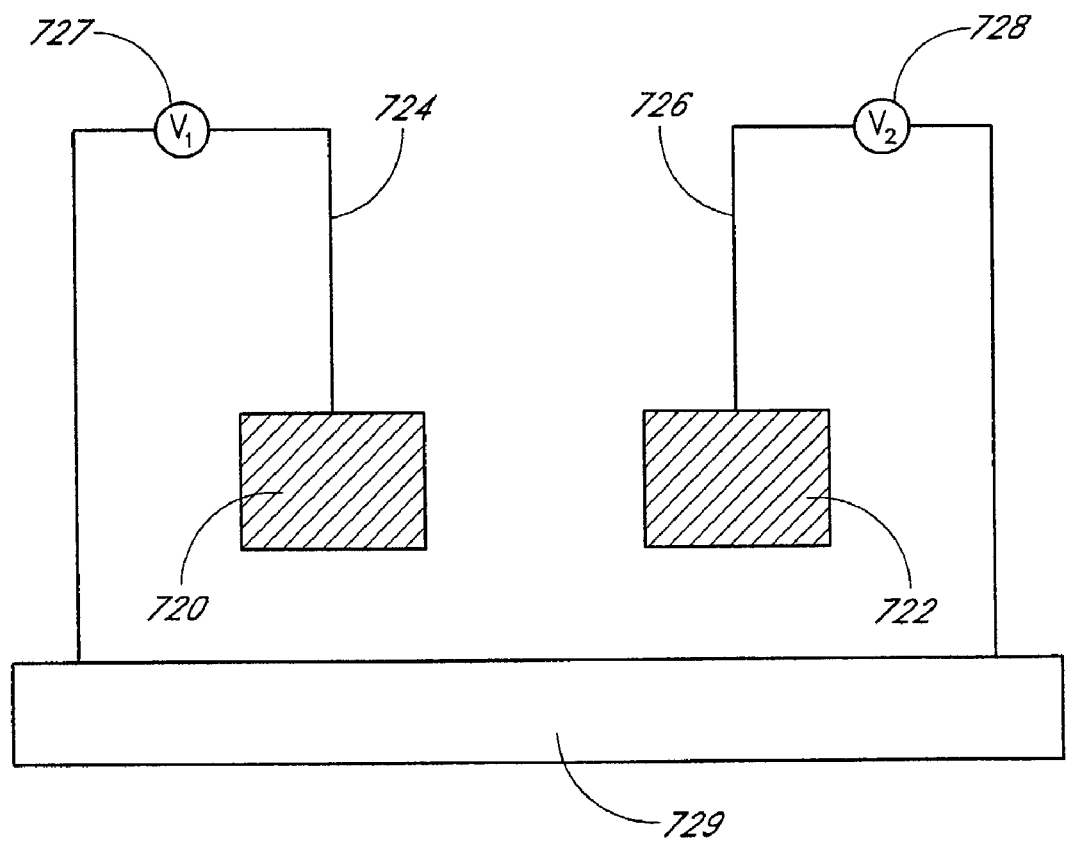

FIG. 17 shows another configuration for modulating the coupling coefficient associated with the directional coupler depicted in FIG. 14. In this design, the capacitance between the two waveguides and another close-by structure permits storage of charge on the waveguides. As shown, the first waveguide 720 and the second waveguide 722 are electrically connected to separate voltage sources 727, 728 via a first electrode 724 and second electrode 726, respectively. Applying voltages $V_1$ and $V_2$ between the waveguides 720, 722 and a nearby structure, such as the substrate 729 of an SOI wafer, results in the capacitive storage of free carriers of the coupling region of each waveguide. Depending upon the sign of the applied voltages $V_1$ and $V_2$ and the doping of the waveguides (i.e., n-type or p-type), the refractive indexes in the coupling regions of the waveguides 700, 702 may be independently increased or decreased. As such, the confinement within the two guides and the resulting coupling therebetween can be modulated as desired. The coupling coefficient will also vary accordingly.

Figure 18:
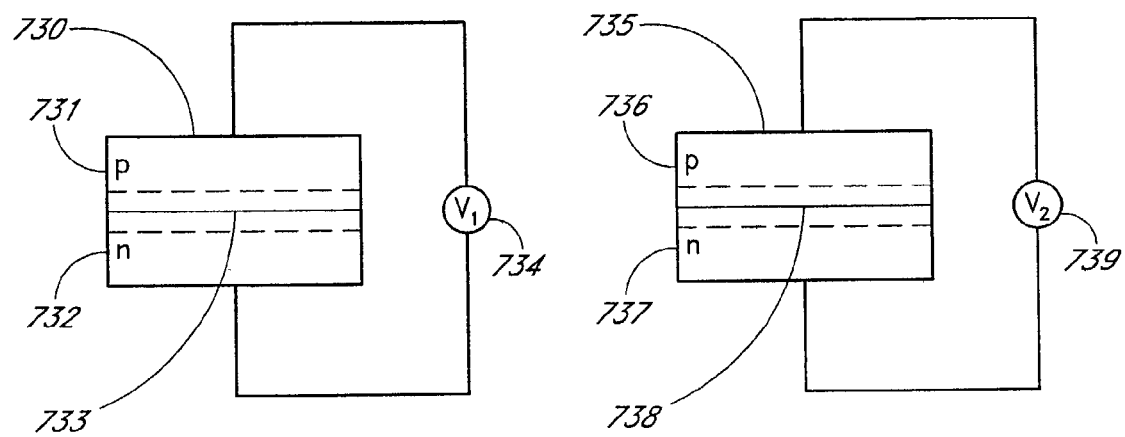

FIG. 18 shows another configuration for modulating the coupling coefficient associated with the directional coupler depicted in FIG. 14. As shown in FIG. 18, the first and second waveguides 730, 735 may include both a p-type region 731, 736 and an n-type region 732, 737 so as to form p-n junctions. These waveguides are independently electrically connected to voltage sources 734, 739.

The free carrier distribution associated with p-n junctions exposed to an applied voltage is very well known. In the absence of an applied field, some of the free electrons in the n-type region 732, 737 diffuse across the junction and combine with holes in the p-type region 731, 736. The region in which electrons and holes combine form a depletion region 733, 738 lacking in free electrons and holes. The application of a voltage across the p-n junction either expands or contracts the size of the depletion region 733, 738, depending upon the sign of the applied voltage. Forward biasing the p-n junction shrinks the depletion region 733, 738 and, if the voltage exceeds about a specific threshold amount, e.g., 0.5 volts, depending on the design, a substantial electrical current is created across the junction. Reverse biasing the p-n junction expands the depletion region 733, 738 and results in essentially no electrical current unless the applied voltage exceeds a threshold "breakdown voltage" of the junction. When the breakdown voltage is exceeded, reverse bias creates a large electrical current across the junction. Thus, for low power operation, this structure is preferably operated under reverse bias conditions below the breakdown voltage when the current through the junction is not as high as in the other modes of operation.

Applying a reverse bias to the p-n junction of one of the waveguides 730, 735 depletes free carriers and increases the refractive index in the waveguide thereby enhancing confinement and correspondingly decreasing the evanescent field. With each p-n junction electrically connected to a different voltages, respective voltages can be applied independently to the first and second waveguides 730, 735. Thus, the coupling coefficient can be modulated as desired. Various other configuration are possible such as those discussed above, for example, wherein a single voltage source is electrically connected to both waveguides 730, 735 and/or electrical connections are made to a common electrical plane.

Figure 19:
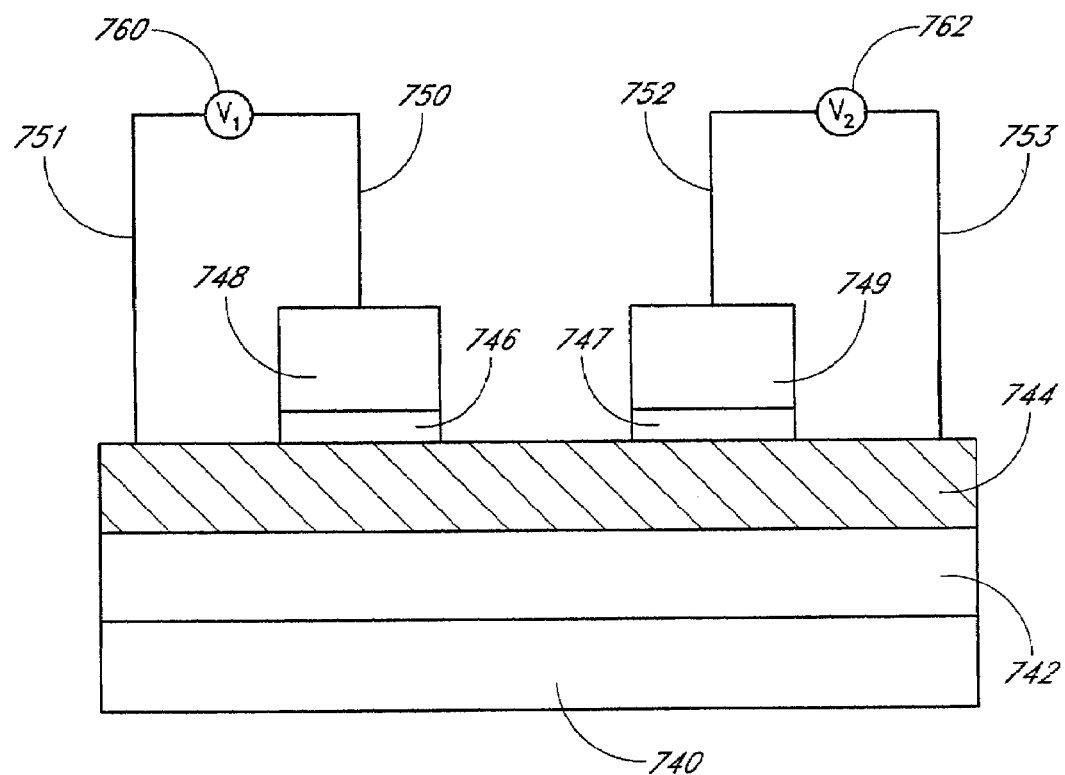

FIG. 19 illustrated how such coupling between two strip loaded waveguide portions having insulating transition layers can be controlled in a directional coupler. The technique for modulating the coupling coefficient between two waveguides portions is similar to that described above. As illustrated in FIG. 19, to form the directional coupler a planar slab 744 is disposed on top of a cladding layer 742 formed on a substrate 740. As shown, air may surround top portions of the slab 744 creating a total internal reflection boundary at the slab/air interface. The slab 744 preferably comprises a material having a higher refractive index than the lower cladding layer 742 to, along with the slab/air interface, provide the vertical confinement. Preferably, the slab 744 comprises semiconductor which is doped and the cladding layer 742 comprise a dielectric. In one preferred embodiment, the planar waveguide comprises silicon, e.g., single crystal silicon, and the insulating layer comprises silicon dioxide, which forming the conventional SOI structure discussed previously.

Light is confined horizontally within the planar waveguide 744 along two distinct paths defined by first and second strips 748, 749, each extend longitudinally to guide the light along curvilinear paths such as shown in FIG. 14. As discussed earlier, the high refractive index strips 748, 749, have the effect of substantially confining the light to the regions beneath them. These elongated strips 748, 749 are preferably comprised of polysilicon. Alternatively, they may comprise single crystal silicon. Other material may be used as well, as described above.

This structure further includes insulating transition layers 746, 747 between the strips 748, 749 and the substantially planar slab 744 so as to allow for field effect manipulation of the free carriers in the waveguides. A voltage can be applied through the first strip 748 via a first strip electrode 750 electrically connected to a first variable voltage source 760. A voltage can be applied through the second strip 749 via a second strip electrode 752 electrically connected to a second variable voltage source 762. Each voltage source is preferably electrically connected to the surface of the substantially planar slab 744 via leads 751, 753 that form ohmic contacts with a doped region (omitted from FIG. 19 for clarity) on the slab 744.

As discussed previously, the field effect may be used to control the distribution of free carriers in a semiconductor, such as the substantially planar slab 744. Thus, by applying voltages $V_1$, $V_2$ across the insulating layers 748, 747, it is possible to increase or decrease the refractive index in portions of the slab 744 underneath the strips 748, 749. Thus, the shape of the optical mode within the guiding region can be control, and the coupling coefficient can be modulated as desired.

Figure 20A:
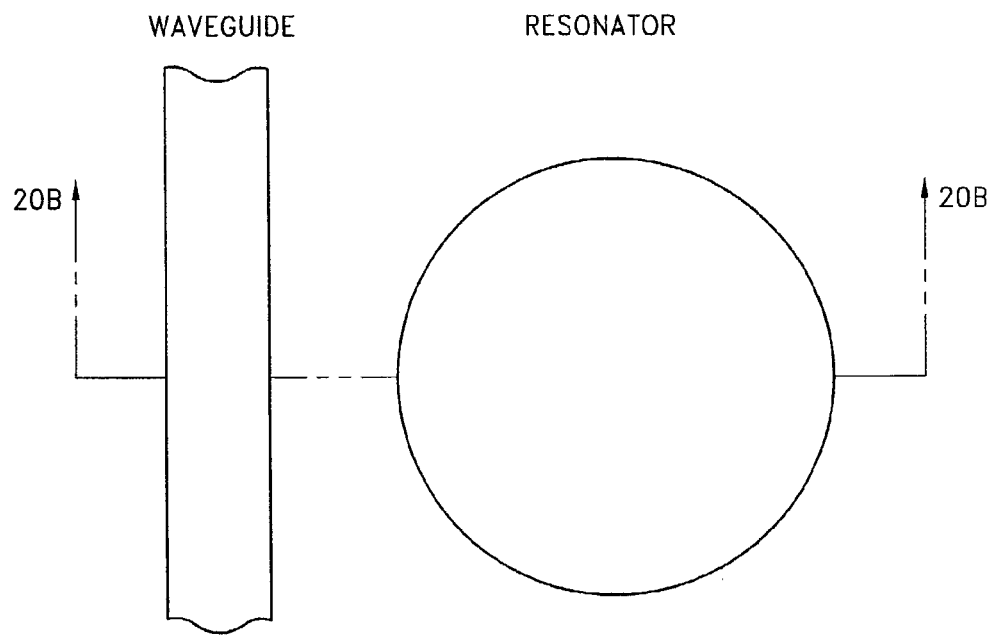
FIG. 20A shows a schematic top view of a waveguide adjacent to a disk-shaped optical resonator.
Figure 20B:
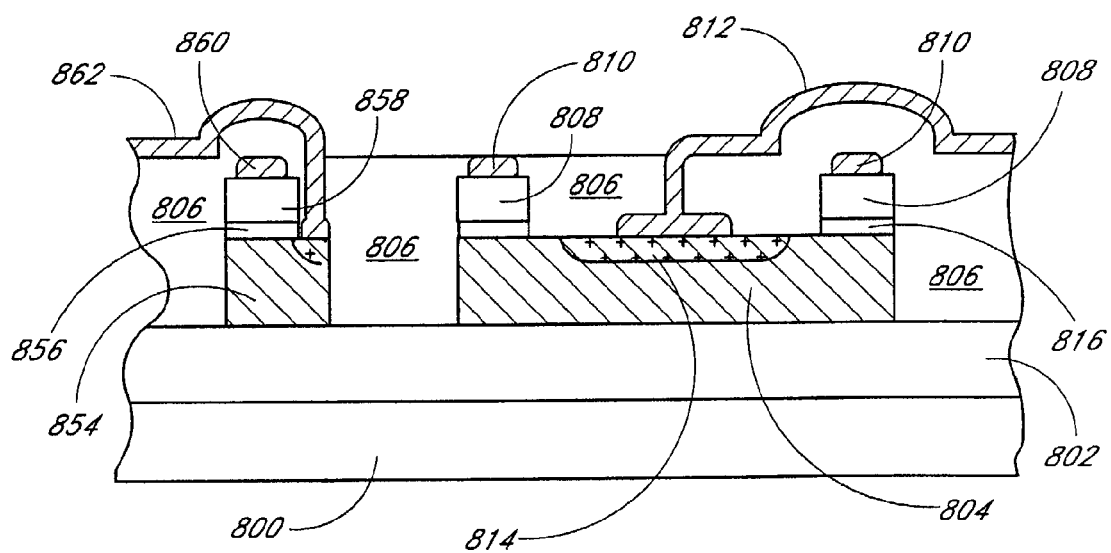
FIG. 20B shows a cross-sectional view of the waveguide and optical resonator along a line 20B—20B in FIG. 20A.

FIGS. 20A and 20B illustrated how the coupling coefficient between an elongated waveguide and a resonant cavity can be variably controlled. FIG. 20A is a top view of the elongated waveguide and resonant cavity. FIG. 20B is a cross-sectional view along the line 20B—20B in FIG. 20A. As shown, the waveguide and resonant cavity comprise elongated and disk-shaped slabs 854, 804, respectively, disposed atop a lower cladding layer 802 formed on a substrate 800. An insulating layer 806 is formed over the slabs 854, 804 to provide an upper cladding layer as well as to provide electrical insulation for conductive pathways in the structure. The elongated and disk-shaped slabs 854, 804 preferably comprise material having an index of refraction higher than that of the upper and lower cladding layers 806, 802 to provide vertical confinement. The slabs 854, 804 preferably comprise semiconductor, which may be doped, and lower cladding layer comprises dielectric material. More specifically, the slabs 854 and 804 preferably comprise single crystal silicon and the lower cladding layer 802 preferably comprises silicon dioxide, forming the SOI structure discussed previously.

An elongated strip 858 is formed over the waveguide slab 854 and an annular shaped strip 808 is disposed over the disk-shaped slab 804. Light is confined horizontally within the slabs 854, 804 by the respective strips 808, 804. The geometry of the structures are such that light will propagate longitudinally along the elongated slab 854 and around a circular path around the periphery of the disk-shaped slab 804. The strips 808, 858 are preferably comprised of polysilicon or single crystal silicon. Alternatively, they may comprise other materials as discussed above.

Thin insulating transition layers 816, 856 separate the strips 858, 808 from the slabs 854, 804 in order to allow for field effect manipulation of the free carriers in the elongated waveguide and the resonator. A voltage can be provided through the strip 808 associated with the resonator via an electrode 810 electrically connected to a first voltage source (not shown in FIG. 20). A voltage can be provided through the strip 858 associated with the elongated waveguide via an electrode 860 electrically connected to a second voltage source (also not shown). The first voltage source also is preferably electrically connected to the top surface of the disk-shaped slab 804 via an electrode 812 that forms an ohmic contact with a doped region 814 of the disk-shaped slab 804. The second voltage source is preferably electrically connected to the top surface the elongated slab 854 via an electrode 852 that forms an ohmic contact with a doped region of the waveguide 854.

By applying a voltages across the annular strip 808 and the disk-shaped slab 804, the refractive index underneath the annular strip may be increased or decreased. Likewise, by applying a voltage across elongated waveguide 854 and the elongated strip 858, the refractive index underneath the elongated strip may be increased or decreased. Thus, the coupling coefficient between the elongated waveguide and the resonant cavity 804 can be modulated as desired. Modulation of the coupling coefficient can be implemented in addition to tuning the resonant frequency of the resonator cavity.

In some applications, it is advantageous to maintain a constant coupling coefficient (e.g., to maintain critical coupling) between a waveguide and a resonant cavity while manipulating the resonant frequency of the resonant cavity. The embodiment of FIGS. 20A and 20B allows for such flexibility. In particular, as the refractive index in the resonant cavity is altered in order to shift the resonant frequency, an unwanted consequence may be a shift in the coupling coefficient caused by the shrinking or expanding of the evanescent field in the resonant cavity. This undesirable consequence can be offset by manipulating the refractive index of the waveguide to maintain the same overlap integral between the fields in the waveguide and the resonant cavity. Thus, if tuning of the resonator shrinks the field in the resonator, the waveguide can be simultaneously tuned to expand the field in the waveguide so as to maintain a constant overlap integral. Conversely, if tuning of the resonator extends the field in the resonator, the waveguide can be simultaneously tuned to shrink the field in the waveguide so as to maintain a constant overlap integral. By tuning the waveguide in step with tuning the resonant cavity, a constant coupling coefficient may be maintained. As discussed above, this feature may be advantageous in maintaining critical coupling which requires that the coupling efficiency match the losses in the cavity. However, in other applications, the coupling coefficient may not need to be constant.

Figure 21:
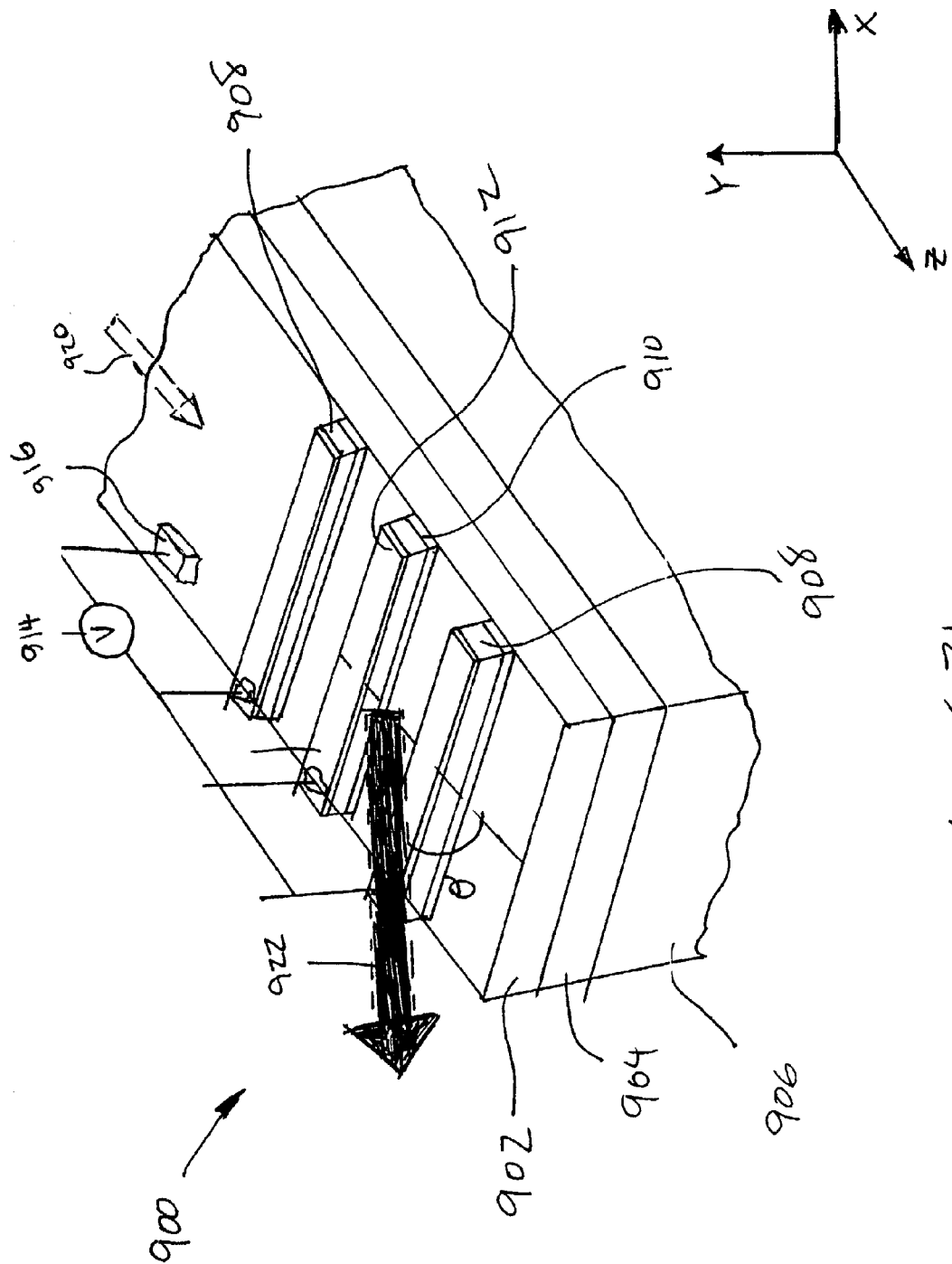
FIG. 21 is a perspective view of a waveguide grating comprising a plurality of electroded rulings on a channel waveguide.

The structures and techniques for varying the effective index of refraction within a waveguide by altering the distribution of free carriers therein can be applied to waveguide gratings 900 such as the one shown in FIG. 21. The waveguide grating 900 comprises a channel waveguide 902 on top of a cladding layer 904 disposed on a substrate 906. The channel waveguide 902 preferably comprises semiconductor, and more preferably comprises doped semiconductor. Also, the channel waveguide 902 preferably has higher index of refraction than the cladding layer 904. In one preferred embodiment, the channel waveguide 902 comprises crystal silicon (e.g., active crystal silicon) and the cladding layer 904 comprises a silicon dioxide layer (e.g., a buried-oxide layer) on a silicon substrate 906.

An insulating layer (not shown) or a plurality of such layers may cover the channel waveguide 902 on top as well as on one or more sides. The insulating layer preferably has a refractive index lower than the refractive index of the channel waveguide 902, so as to act as an upper cladding layer confining light within the channel waveguide. The insulating layer preferably comprises silicon dioxide, which has a refractive index substantially lower than the refractive index of single crystal silicon. The insulating material may comprise other materials such as for example silicon nitride and polymers, like polyimide. The insulating layer or layers also prevents unwanted flow of electrical current between conducting elements of the device.

A plurality of strips or elongate members 908 are arranged over the channel waveguide 902 to created a grating. In some preferred embodiments, the plurality of strips 908 comprise a material having an index of refraction different from the insulating layer (not shown) formed on the channel waveguide 902 so as to perturb the effective refractive index of the channel at localized regions therein. The plurality of strips 908 is disposed over but space apart from the channel waveguide 902. Preferably, the strip material is substantially conductive and may comprise doped semiconductor. In certain preferred embodiments, the plurality of strips 908 comprise doped polysilicon or single crystal silicon, however, other different materials may be used for the strips 908.

The strip 908 is separated from the channel waveguide 902 by an insulating layer 910 comprised of dielectric material to prevent the flow of current between the strip and the channel waveguide and to thereby facilitate carrier accumulation and depletion. This transition layer 910 preferably has sufficiently thickness such that the carriers do not traverse this barrier either by tunneling or through defects such as "pin hole" defects. Conversely, the thickness of this dielectric layer 910 is preferably not so large as to require a large voltage to be applied to the device to accumulate or deplete the desired amount of carriers. In one preferred embodiment, this transition layer 206 comprises silicon dioxide.

As shown in FIG. 21, the waveguide grating 900 further includes strip electrodes 912 electrically connected to the strips 908. Ohmic contacts and silicide may be used to create suitable electrical connections between the electrodes 912 and the strips, which preferably comprise doped semiconductor. These strip electrodes 912 are electrically connected to a voltage source 914. This voltage source 914 may be an AC or DC voltage supply depending on the particular application. Some or all of the strip electrodes 912 may electrically connected together and to the voltage source 914. Alternatively, one or more voltage sources can be electrically connected to individual or groups of electrodes 912 associated with different strips 908. The waveguide grating 900 preferably includes one or more channel waveguide electrode 916 electrically coupled to a surface of the channel waveguide 902. Once again, ohmic contacts and silicide may be employed to produce a low resistance electrical connection between the channel electrode 916 and the channel waveguide 902. The strip and channel waveguide electrodes 912, 916 preferably are comprised of metal, although one of skill in the art would recognize that other materials, such as doped polysilicon, may be used. Other configurations for establishing an electric field between the strips 908 and the channel waveguide 902 are possible and should not be limited to the electrical arrangement illustrated in FIG. 21.

As indicated by the arrow 920, optical power propagating longitudinally within the channel waveguide 902 is guided therein. As described above, the effective index of refraction within the channel waveguide 902 is higher than the surrounding cladding regions, e.g., upper and lower claddings 904, and is accordingly confined laterally therein. The strips 902, however, may perturb the effective index of the channel waveguide 902. The periodic perturbation of the effective index of refraction creates a grating that scatters the light within the channel waveguide 902. If the strips 908 are appropriately placed, light of the desired wavelength will be coupled out of the channel waveguide 902 at a specific angle, θ, as illustrated by arrow 922. This angle, θ, is determined in part by the effective index of refraction within the channel waveguide 902 as well as by the spacing of the grating. These relationships are governed by well known principles of Bragg diffraction set forth in the following equation:

$$\frac{2\pi}{\lambda} n_{\text{eff}} \sin\theta = \frac{\pm m\pi}{\Lambda}$$

where Λ is the grating spacing frequency (i.e., the inverse of the grating spacing), $n_{\text{eff}}$ is the effective refractive index, m is the diffraction order, and λ is the wavelength of the light.

The electrodes on the strips 908 and the channel waveguide 902 facilitate application of a potential difference between the strips and channel waveguide. As discussed above, by applying an electric field to the channel waveguide 902 through the insulating layer 910, the local distribution of carriers below the individual strips 908 can be adjusted and controlled. For example, applying a positive voltage to a strip 908 formed over a p-type semiconductor channel waveguide 902 will induce an electric field that will cause depletion of majority carriers immediately below the strip. Under certain conditions, inversion may be produced wherein negatively charged carriers are attracted to the depletion region. In either case, the free carrier distribution can be controlled and varied. By altering the concentration of free carriers, the localized effective index beneath the individual strips 908 can be adjusted as desired. Accordingly, the effective index beneath one or more strips 908 can be increased or decreased by application of the appropriate voltage to the selected strip. In this manner, the scatter cross-section of the particular "ruling" or strip 908 of the grating can be varied and controlled yielding either increased or decreases scattering and resultant output coupling. In addition, by altering the effective index of refraction, $n_{\text{eff}}$, the angle of output, θ, or the wavelength at a particular angle, θ, can be altered and controlled as is set forth in the Bragg equation referenced-above. Switchable coupling and tunable filtering can be implemented in this manner. Other applications of controlling the carrier distribution within the grating coupler are also possible and are not limited to those discussed above. Increasing the electron density may also result in elevated levels of absorption, which may theoretically be desirable in certain applications, and conversely, depleting free carriers may reduce adsorption.

Other waveguide grating configurations are possible as well. The waveguide grating 900 may, for example, be implemented using waveguides other than channel waveguides. Ridge or rib waveguides, slab, and strip loaded waveguides with or without low index transition layers are a few exemplary candidates but the structures and designs should not be limited to these. In addition, the waveguides may have different shapes and may be integrated together with different structures. Different materials and dimensions may be used. Finally, the grating design might be otherwise and may be altered depending on the application. For example the "rulings" or strips 908 can be shaped differently and may have other than rectangular or square cross sections. These grating may for instance be blazed. Still other variations in design are considered possible. In addition, in the case where the grating waveguide 900 comprises a strip loaded waveguide having an insulating transition region as described above, it is possible to simultaneously change the distribution of carriers beneath the strip (i.e., in the slab) and beneath also the "rulings" or strips 908 of the grating.

The various structures discussed above, offer a wide range of advantages and can be employed in a broad variety of applications. For example, tunable resonant cavities can be utilized for selectively filtering one or more given optical frequencies. These resonant cavities may include an active material in guiding to provide gain and to thereby form a laser. Thermal or other types of drift in the output frequency of the laser can be monitored and used as feedback to tune the resonant cavity in a fashion similar to that described above. These tunable resonators can be included together with a pair of waveguides to controllably couple light from one waveguide to another. Switching can be performed in this manner. A light source can be modulated with such a configuration by directing light from the light source into one of the waveguides. The output of either of the waveguides will correspond to a modulated optical signal depending on the modulation introduced by the resonant cavity. In this manner, information, voice or data, may be imparted on the optical signal. Switching can be implemented with directional coupler comprising two waveguides without any resonant filter as described above. These filters, modulators, variable optical couplers, directional couplers and switches and various other devices may find use in optical communications and telecommunications but should not limited to any particular application. Additionally, tunable waveguide gratings can be created that allow the output angle, wavelength, and scattering strength, among other parameters, to be varied and controlled.

As described above, silicon is substantially optically transmissive to certain wavelengths of interest such as 1.55 microns. In addition, processes for fabricating silicon structures are well developed. For these reasons, waveguide structures comprising polysilicon and silicon are advantageous.

Although silicon is beneficial because it is substantially transparent at certain wavelengths, other materials and more particularly, other semiconductors may be employed as well. Furthermore, the structures described herein are not to be limited to any particular wavelength or wavelength range and may be designed, for example, for microwave, infrared, visible, and ultraviolet wavelengths.

Those skilled in the art will appreciate that the methods and designs described above have additional applications and that the relevant applications are not limited to those specifically recited above. Also, the present invention may be embodied in other specific forms without departing from the essential characteristics as described herein. The embodiments described above are to be considered in all respects as illustrative only and not restrictive in any manner.

What is claimed is:

1. An optical waveguide coupler having a tunable coupling coefficient, said coupler comprising:
   a first waveguide and a second waveguide comprising first and second cores respectively, said first and second cores separated by cladding in an evanescent coupling region, said first and second waveguides supporting respective first and second spatial modes, wherein said first and second waveguides are comprised of semiconductor having a distribution of free carriers, and said cladding comprises a dielectric material that electrically isolates the first and second waveguides from each other, said first waveguide comprising an optical path in a resonant cavity;
   a first electrode electrically connected to said first waveguide;
   a second electrode electrically connected to said second waveguide; and
   a variable voltage source connected between first and second electrodes;
   wherein the distributions of free carriers are responsive to application of said voltage such that index of refraction variations can be introduced in said first waveguide to increase or decrease confinement of said first spatial mode and alter overlap of said first and second spatial modes in said cladding of said coupling region thereby changing the coupling coefficient between said waveguides from a first value to a second value.

2. A method of tuning the coupling coefficient of an optical waveguide coupler, comprising:
   providing a first waveguide comprising semiconductor containing a distribution of free carriers, said first waveguide comprising an optical path in a resonant cavity;
   providing a second waveguide separated from and electrically isolated from said first waveguide, said second waveguide comprising semiconductor containing a distribution of free carriers, said first and second waveguides supporting first and second spatial modes respectively; and
   applying a voltage between said first and second waveguides to alter the free carrier distribution in said semiconductor so as to reduce confinement of said first spatial mode in said first waveguide and increase overlap between said first and second spatial modes, thereby changing the coupling coefficient of said optical waveguide coupler from a first value to a second value.

3. A capacitor comprising:
   a first capacitor electrode comprising a first semiconductor optical waveguide;
   a second capacitor electrode comprising a second semiconductor optical waveguide, the second semiconductor waveguide comprising a portion of a resonant cavity;
   a dielectric comprising cladding disposed between said first and second optical waveguides,
   wherein the first and second semiconductor optical waveguides are sufficiently close to permit evanescent optical coupling therebetween, said coupling changeable with application of a voltage between said first and second capacitor electrodes.

4. The apparatus of claim 3, further comprising a variable voltage supply that is electrically connected between the first and second semiconductor optical waveguides.

5. A method of optically switching, comprising:
   applying a voltage across first and second electrodes of a capacitor comprising respective first and second waveguides separated from each other by an interelectrode dielectric wherein at least one of the first and second waveguides comprises at least a portion of a resonant cavity;
   wherein application of said voltage induces storage of charge on said first and second electrodes thereby altering coupling of optical modes in said first waveguide to said second waveguide.

6. The method of claim 5, wherein said voltage induces storage of opposite charge in the first and second electrodes.

7. The method of claim 5, further comprising causing index of refraction variations by inducing said storage of charge.

8. The method of claim 7, further comprising modifying the propagation constant of light in said first and second waveguides with said index of refraction variations.

9. The method of claim 7, further comprising modifying optical confinement of said first and second waveguides with said index of refraction variation.

10. The method of claim 5, further comprising modifying evanescent coupling between said first and second waveguides by inducing said stored charge.

11. The method of claim 5, further comprising transmitting an optical signal through said first waveguide and varying the fraction of light coupled from said first waveguide into said second waveguide by storage of charge in said capacitor.

12. The method of claim 11, wherein said voltage applied between the first and second electrodes induces storage of opposite charge in the first and second waveguides.

13. The method of claim 11, further comprising using said storage of charge to modify the effective index of at least one of said first and second waveguides.

14. The method of claim 11, further comprising using said storage of charge to modify the optical confinement of at least one of said first and second waveguides.

15. The method of claim 11, further comprising using said storage of charge to modify evanescent coupling between said first and second waveguides.

16. The method of claim 11, further comprising using said storage of charge to modify the propagation constant of light in said first and second waveguides.

17. The optical waveguide coupler of claim 1, wherein said first and second waveguides comprise elements of a directional coupler.

18. The optical waveguide coupler of claim 1, wherein said resonant cavity comprises a closed loop.

19. The optical waveguide coupler of claim 1, wherein said resonant cavity is configured to support a single optical mode.

20. The optical waveguide coupler of claim 1, wherein said first and second waveguides are symmetrical about a centerline disposed therebetween.

21. The optical waveguide coupler of claim 1, wherein said first and second waveguides are monothically fabricated on a single substrate.

22. The optical waveguide of claim 21, further comprising electronics integrated on the same substrate.

23. The optical waveguide coupler of claim 22, further comprising dielectric material over said first and second waveguides, said dielectric arranged to provide electrical isolation for conductive pathways.

24. The optical waveguide coupler of claim 1, wherein application of said voltage induces free carriers of opposite sign to accumulate in the first and second waveguides.

25. The optical waveguide coupler of claim 24, wherein electrons accumulate in the first waveguide and holes accumulate in the second waveguide.

26. The optical waveguide coupler of claim 25, wherein the free carriers are concentrated in the first and second cores adjacent the cladding between the first and second waveguides.

27. The optical waveguide coupler of claim 25, wherein the dielectric cladding material prevents the carriers from freely flowing between the first and second waveguides.

28. The method of claim 2, wherein applying said voltage induces free carriers of opposite sign to accumulate in first and second cores in the first and second waveguides, respectively.

29. The method of claim 28, wherein electrons accumulate in the first waveguide and holes accumulate in the second waveguide.

30. The capacitor of claim 3, wherein application of said voltage induces free carriers of opposite sign to accumulate in the first and second optical waveguides.

31. The capacitor of claim 30, wherein electrons accumulate in the optical waveguide and holes accumulate in the second optical waveguide.

32. The capacitor of claim 30, wherein the free carriers are concentrated in portions of the first and second waveguides adjacent the cladding between the first and second waveguides.

33. The capacitor of claim 30, wherein the dielectric prevents the carriers from freely flowing between the first and second waveguides.

34. The method of claim 6, wherein electrons accumulate in the first waveguide and holes accumulate in the second waveguide.

35. The optical waveguide of claim 1, wherein at least one of the first and second waveguides comprises a rib waveguide.

36. The optical waveguide of claim 1, wherein at least one of the first and second waveguides comprises a strip-loaded waveguide.

37. The method of claim 2, wherein at least one of the first and second waveguides comprises a rib waveguide.

38. The method of claim 2, wherein at least one of the first and second waveguides comprises a strip-loaded waveguide.

39. The capacitor of claim 3, wherein at least one of the first and second semiconductor optical waveguides comprises a rib waveguide.

40. The capacitor of claim 3, wherein at least one of the first and second semiconductor optical waveguides comprises a strip-loaded waveguide.

41. The method of claim 5, wherein at least one of the first and second waveguides comprises a rib waveguide.

42. The method of claim 5, wherein at least one of the first and second waveguides comprises a strip-loaded waveguide.

43. An optical waveguide coupler having a tunable coupling coefficient, said coupler comprising:
   a first waveguide and a second waveguide comprising first and second cores respectively, said first and second cores separated by cladding in an evanescent coupling region, said first and second waveguides supporting respective first and second spatial modes, wherein said first waveguide is comprised of semiconductor having a distribution of free carriers, and said cladding comprises a dielectric material that electrically isolates the first and second waveguides from each other, said first waveguide comprising an optical path in a resonant cavity;
   a first electrode electrically connected to the first waveguide; and
   a variable voltage source coupled to the first electrode so that a voltage is applied to the first waveguide via the first electrode;
   wherein the distributions of free carriers are responsive to application of said voltage such that index of refraction variations can be introduced in said first waveguide to increase or decrease confinement of said first spatial mode and alter overlap of said first and second spatial modes in said cladding of said coupling region thereby changing the coupling coefficient between said waveguides from a first value to a second value.

44. The optical waveguide of claim 43, wherein at least one of the first and second waveguides comprises a rib waveguide.

45. The optical waveguide of claim 43, wherein at least one of the first and second waveguides comprises a strip-loaded waveguide.

46. The optical waveguide of claim 43, wherein at least one of the first and second waveguides comprises silicon.

47. A method of tuning the coupling coefficient of an optical waveguide coupler, comprising:

providing a first waveguide comprising semiconductor containing a distribution of free carriers, said first waveguide comprising an optical path in a resonant cavity; providing a second waveguide separated from and electrically isolated from said first waveguide, said first and second waveguides supporting first and second spatial modes respectively; and applying a voltage to said first waveguide to alter the free carrier distribution in said semiconductor so as to reduce confinement of said first spatial mode in said first waveguide and increase overlap between said first and second spatial modes, thereby changing the coupling coefficient of said optical waveguide coupler from a first value to a second value.

48. The method of claim 47, wherein at least one of the first and second waveguides comprises a rib waveguide.

49. The method of claim 47, wherein at least one of the first and second waveguides comprises a strip-loaded waveguide.

50. The method of claim 47, wherein at least one of the first and second waveguides comprises silicon.

* * * * *